(12) United States Patent
Hiel et al.

(10) Patent No.: US 7,060,326 B2
(45) Date of Patent: Jun. 13, 2006

(54) ALUMINUM CONDUCTOR COMPOSITE CORE REINFORCED CABLE AND METHOD OF MANUFACTURE

(75) Inventors: Clement Hiel, Rancho Palos Verdes, CA (US); George Korzeniowski, Woodland Hills, CA (US)

(73) Assignee: Composite Technology Corporation, Irvine, CA (US)

( * ) Notice: Subject to any disclaimer, the term of this patent is extended or adjusted under 35 U.S.C. 154(b) by 0 days.

(21) Appl. No.: 10/692,304

(22) Filed: Oct. 23, 2003

(65) Prior Publication Data

US 2004/0131834 A1 Jul. 8, 2004

Related U.S. Application Data

(63) Continuation-in-part of application No. PCT/US03/12520, filed on Apr. 23, 2003.

(60) Provisional application No. 60/374,879, filed on Apr. 23, 2002.

(51) Int. Cl.
*B05D 3/02* (2006.01)

(52) U.S. Cl. .............. 427/384; 427/372.2; 427/430.1; 427/434.2; 427/434.6

(58) Field of Classification Search ............. 427/372.2, 427/384, 430.1, 434.2, 434.6
See application file for complete search history.

(56) References Cited

U.S. PATENT DOCUMENTS

| | | | |
|---|---|---|---|
| 3,331,919 A | 7/1967 | Vayson | |
| 3,692,924 A | 9/1972 | Nye | |
| 3,717,720 A | 2/1973 | Snellman | |
| 3,808,078 A | 4/1974 | Snellman | |
| 3,973,385 A | 8/1976 | Roe | |
| 4,059,951 A | 11/1977 | Roe | |
| RE32,374 E | 3/1987 | Dey | |
| 4,763,981 A | 8/1988 | Wilkins | |
| 4,961,990 A | 10/1990 | Yamada | |
| 5,122,622 A | 6/1992 | Reuss | |
| 5,198,621 A | 3/1993 | Kojima | |
| 5,222,173 A | 6/1993 | Bausch | |

(Continued)

FOREIGN PATENT DOCUMENTS

EP 0346499 B1 5/1995

(Continued)

OTHER PUBLICATIONS

Sucuma P. Elliot, "HECO puts new composite conductors to the test", Transmission and Distribution World, Jun. 1, 2003.

(Continued)

*Primary Examiner*—J. M. Gray
(74) *Attorney, Agent, or Firm*—The McIntosh Group

(57) ABSTRACT

This invention relates to an aluminum conductor composite core reinforced cable (ACCC) and method of manufacture. An ACCC cable has a composite core surrounded by at least one layer of aluminum conductor. The composite core comprises a plurality of fibers from at least one fiber type in one or more matrix materials. The composite core can have a maximum operating temperature capability above 100° C. or within the range of about −45° C. to about 230° C., at least 50% fiber to resin volume fraction, a tensile strength in the range of about 160 Ksi to about 370 Ksi, a modulus of elasticity in the range of about 7 Msi to about 37 Msi and a coefficient of thermal expansion in the range of about $-0.7 \times 10^{-6}$ m/m/° C. to about $6 \times 10^{-6}$ m/m° C. According to the invention, a B-stage forming process may be used to form the composite core at improved speeds over pultrusion processes wherein the speeds ranges from about 9 ft/min to about 60 ft/min.

11 Claims, 11 Drawing Sheets

U.S. PATENT DOCUMENTS

| | | |
|---|---|---|
| 5,296,456 A | 3/1994 | Shiga |
| 5,561,729 A | 10/1996 | Parris |
| 5,651,081 A | 7/1997 | Blew |
| 5,847,324 A | 12/1998 | Farquhar |
| 5,917,977 A | 6/1999 | Barrett |
| 6,180,232 B1 | 1/2001 | McCullough |
| 6,245,425 B1 | 6/2001 | McCullough |
| 6,270,856 B1 | 8/2001 | Hendewerk |
| 6,344,270 B1 | 2/2002 | McCullough |
| 6,423,808 B1 | 7/2002 | Watanabe |
| 6,447,927 B1 | 9/2002 | McCullough |
| 6,463,198 B1 | 10/2002 | Coleman |
| 6,528,729 B1 | 3/2003 | Kamata |
| 6,568,072 B1 | 5/2003 | Wilemon |
| 6,861,131 B1 * | 3/2005 | Evans ............... 428/304.4 |
| 2002/0176979 A1 * | 11/2002 | Evans ............... 428/292.1 |
| 2002/0189845 A1 | 12/2002 | Gorrell |

FOREIGN PATENT DOCUMENTS

| | | |
|---|---|---|
| EP | 1124235 A2 | 8/2001 |
| EP | 1168374 A2 | 1/2002 |
| JP | 1126388 A | 9/1999 |
| WO | WO03/050825 A1 | 6/2003 |

OTHER PUBLICATIONS

Office of Industrial Technologies, "Development of a Composite-Reinforced Aluminum Conductor", Dec., 2001.

Oak Ridge National Laboratory, "Power Grid of the Future", ONRL Review, vol. 35, No. 2, 2002, web-print.

Alcoa Conductor Products Company, "T&D Conductors; Overhead; Underground; Building Wire", Jul. 1, 1989, p. 33.

* cited by examiner

ALUMINUM CONDUCTOR COMPOSITE CORE REINFORCED CABLE AND METHOD OF MANUFACTURE

CROSS REFERENCES TO RELATED APPLICATIONS

In relation to this Continuation in Part Application, applicants claim priority of earlier PCT filing PCT/US03/12520 filed in the International Receiving Office of the United States Patent and Trademark Office on 23 Apr. 2003, the entire disclosure of which is incorporated by reference herein, which claims priority from U.S. provisional application Ser. No. 60/374,879 filed in the United States Patent and Trademark Office on 23 Apr. 2002, the entire disclosure of which is incorporated by reference herein.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The present invention relates to an aluminum conductor composite core (ACCC) reinforced cable and method of manufacture. More particularly, the present invention relates to a cable for providing electrical power having a composite core, formed by fiber reinforcements and a matrix, surrounded by aluminum conductor capable of carrying increased ampacity and operating at elevated temperatures.

2. Description of the Related Art

In a traditional aluminum conductor steel reinforced cable (ACSR) the aluminum conductor transmits the power and the steel core is designed to carry the transfer load. Conductor cables are constrained by the inherent physical characteristics of the components; these components limit ampacity. Ampacity is a measure of the ability to send power through the cable. Increased current or power on the cable causes a corresponding increase in the conductor's operating temperature. Excessive heat will cause the cable to sag below permissible levels. Typical ACSR cables can be operated at temperatures up to 100° C. on a continuous basis without any significant change in the conductor's physical properties related to sag. Above 100° C., ACSR cables suffer from thermal expansion and a reduction in tensile strength. These physical changes create excessive line sage. Such line sag has been identified as one of the possible causes of the power blackout in the Northeastern United States in 2003. The temperature limits constrain the electrical load rating of a typical 230-kV line, strung with 795 kcmil ACSR "Drake" conductor, to about 400 MVA, corresponding to a current of 1000 A. Therefore, to increase the load carrying capacity of transmission cables, the cable itself must be designed using components having inherent properties that allow for increased ampacity without inducing excessive line sag.

Although ampacity gains can be obtained by increasing the conductor area that surrounds the steel core of the transmission cable, increasing conductor volume increases the weight of the cable and contributes to sag. Moreover, the increased weight requires the cable to use increased tension in the cable support infrastructure. Such large weight increases typically would require structural reinforcement or replacement of the electrical transmission towers and utility poles. Such infrastructure modifications are typically not financially feasible. Thus, there is financial motivation to increase the load capacity on electrical transmission cables while using the existing transmission structures and liens.

Prior art applications disclose a composite core comprised of a single type of glass fiber and thermoplastic resin. The object is to provide an electrical transmission cable which utilizes a reinforced plastic composite core as a load bearing element in the cable and to provide a method of carrying electrical current through an electrical transmission cable which utilizes an inner reinforced plastic core. The composite core fails in these objectives. A one fiber system comprising glass fiber does not have the required stiffness to attract transfer load and keep the cable from sagging. Secondly, a composite core comprising glass fiber and thermoplastic resin does not meet the operating temperatures required for increased ampacity, namely, between 90° C. and 230° C.

Physical properties of composite cores are further limited by processing methods. Previous processing methods cannot achieve a high fiber to resin ratio by volume or weight. These processes do not allow for creation of a fiber rich core that will achieve the strength required for electrical cables. Moreover, the processing speed of previous processing methods is limited by inherent characteristics of the process itself. For example, traditional pultrusion dies are approximately 36 inches long, having a constant cross section. The longer dies create increased friction between the composite and the die slowing processing time. The processing times in such systems for epoxy resins range from about 3 inches/minute to about 12 inches/minute. Processing speeds using polyester and vinyl ester resins can produce composites at up to 72 inches/minute. With thousands of miles of cables needed, these slow processing speeds fail to meet the need in a financially acceptable manner.

It is therefore desirable to design an economically feasible cable that facilitates increased ampacity without corresponding cable sag. It is further desirable to process composite cores using a process that allows configuration and tuning of the composite cores during processing and allows for processing at speeds up to 60 ft/min.

BRIEF SUMMARY OF THE INVENTION

An aluminum conductor composite core (ACCC) reinforced cable can ameliorate the problems in the prior art. The ACCC cable is an electrical cable with a composite core made from one or more fiber type reinforcements and embedded in a matrix. The composite core is wrapped in an electrical conductor. An ACCC reinforced cable is a high-temperature, low-sag conductor, which can be operated at temperatures above 100° C. while exhibiting stable tensile strength and creep elongation properties. In exemplary embodiments, the ACCC cable can operate at temperatures above 100° C. and in some embodiments up to or near 230° C. An ACCC cable with a similar outside diameter may increase the line rating over a prior art cable by at least 50% without any significant changes in the weight of the conductor.

In an ACCC cable, the core of the distribution and transmission cable is replaced with a composite strength member comprising a plurality of fibers selected from one or more fiber types and embedded in a matrix. The important characteristics of the ACCC cable are a relatively high modulus of elasticity and a relatively low coefficient of thermal expansion, which help increase the ampacity of the conductor cable. It is further desirable to design composite cores having long term durability. The composite strength member may operate at least sixty years, and more preferably seventy years, at elevated operating temperatures above 90° C. and possibly up to 230° C.

Further, the invention allows for formation of a composite core having a smaller core size. The smaller core size acts as the only load bearing member in the ACCC cable. This smaller core size allows the cable to accommodate an increased volume of aluminum without changing the conductor outside diameter. The ACCC cable can have the same or greater strength and the same or less weight as a conductor cable with a steel core, but can include more conductor around the core. With more conductor, the ACCC cable can carry increased ampacity.

To achieve the desired ampacity gains, a composite core according to the invention may combine fibers having a low modulus of elasticity for lower stiffness with fibers having a high modulus of elasticity for increased stiffness or strength. By combining fibers, new property sets are obtained, including different modulus of elasticity, thermal expansion, density, and cost. Sag versus temperature calculations show improved ampacity over ACSR cables when a high-strength and high-stiffness composite is combined with a lower strength and lower stiffness composite.

Composite cores according to the invention meet certain physical characteristics dependent upon the selection of fiber types and matrix material. Composite cores according to the invention have substantially low coefficient of thermal expansions, substantially high tensile strength, and ability to withstand substantially high operating temperatures, ability to withstand low ambient temperatures, substantially high dielectric properties, and sufficient flexibility to permit winding on a transportation wheel or a transportation drum. In particular, composite cores according to the present invention may have: a tensile strength above 160 Ksi, and more preferably within the range of about 160 Ksi to about 380 Ksi; a modulus of elasticity above 7 Msi, and more preferably within the range of about 7 Msi to about 37 Msi; an operating temperature capability above −45° C., and more preferably within the range of about 90° C. to about 230° C.; and, a coefficient of thermal expansion below $6 \times 10^{-6}$ m/m/° C., and more preferably within the range of about $-0.7 \times 10^{-6}$ m/m/° C. to about $6 \times 10^{-6}$ m/m/° C. These ranges may be achieved by a single fiber type or by a combination of fiber types. Practically, most cores within the scope of this invention comprise two or more fiber types, but a single fiber type may be able to achieve the above ranges. In addition, depending on the physical characteristics desired in the final composite core, the composite core can accommodate variations in the relative amounts of fibers, fiber types, or matrix type.

Composite cores of the present invention can be formed by a B-stage forming process wherein fibers are wetted with resin and continuously pulled through a plurality of zones within the process. The B-stage forming process relates generally to the manufacture of composite core members and relates specifically to an improved apparatus and process for making resin impregnated fiber composite core members. More specifically, according to an exemplary embodiment, a multi-phase B-stage process forms, from fiber and resin, a composite core member with superior strength, higher ampacity, lower electrical resistance and lighter weight. The process enables formation of composite core members having a fiber to resin ratio that maximizes the flexural strength, the compressive strength, and the tensile strength. In a further embodiment, the composite core member is wrapped with high conductivity aluminum or other conductor resulting in an ACCC cable having high strength and high stiffness characteristics.

BRIEF DESCRIPTION OF THE SEVERAL VIEWS OF THE DRAWINGS

These and other features of the invention are best understood by referring to the detailed description of the invention, read in light of the accompanying drawings, in which.

Figure 1:
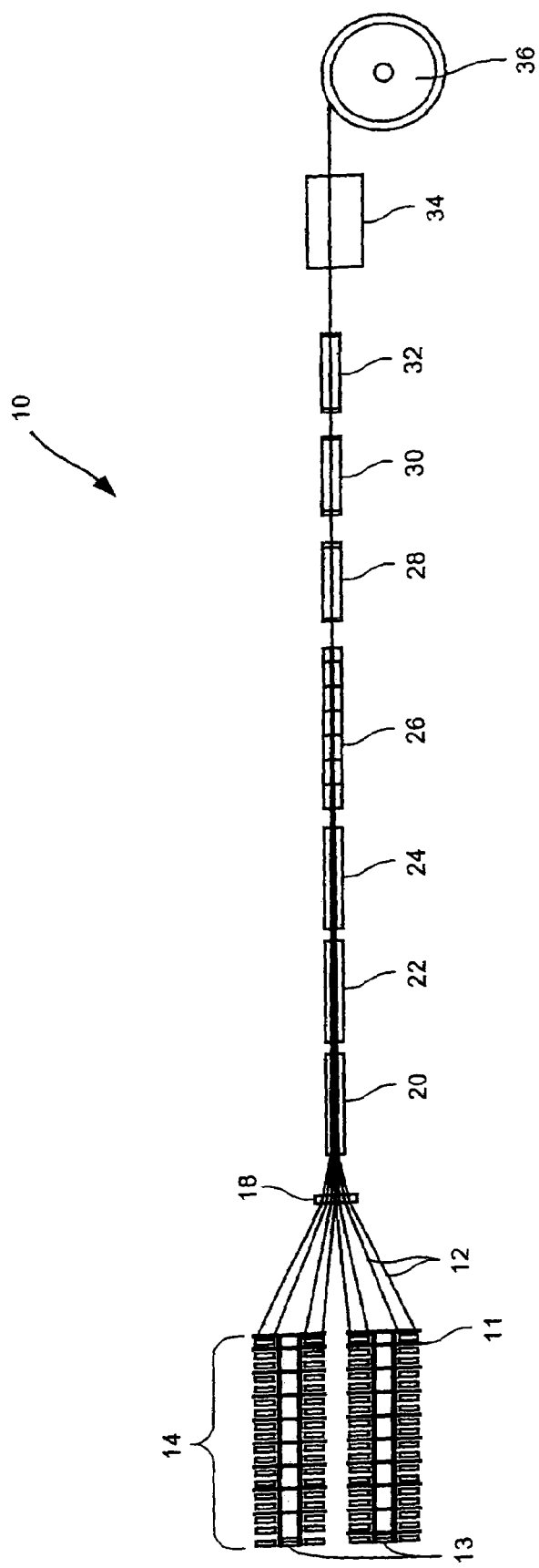
FIG. 1 is a schematic diagram of a B-stage forming process used for forming fiber composite core members in accordance with the present invention.
Figure 3:
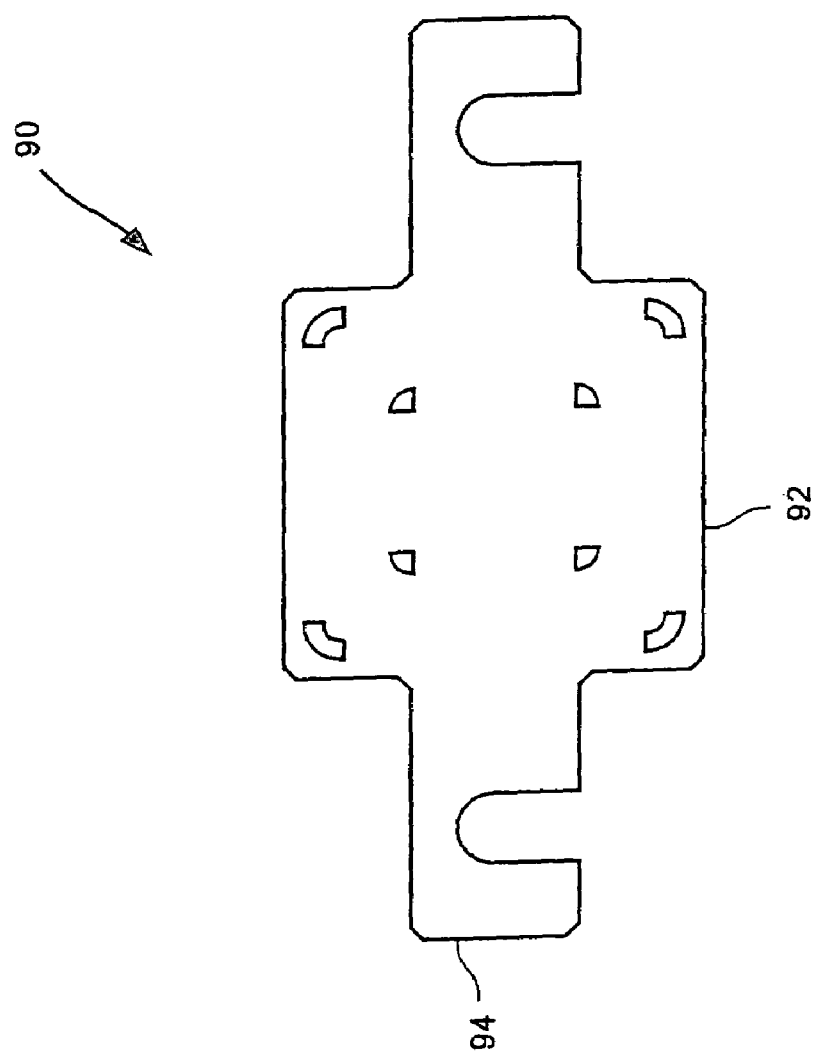
FIG. 3 is a schematic view of the structure of a bushing; said view showing the passageways used to shape and compacts the bundles of fibers in accordance with the present invention.

To clarify, each drawing includes reference numerals. These reference numerals follow a common nomenclature. The reference numeral will have three digits. The first digit represents the drawing number where the reference numeral was first used. For example, a reference numeral used first in drawing one will have a numeral like 1XX, while a numeral first used in drawing four will have a numeral like 4XX. The second two numbers represent a specific item within a drawing. One item in FIG. 1 may be 101 while another item may be 102. Like reference numerals used in later drawing represent the same item. For example, reference numeral 102 in FIG. 3 is the same item as shown in FIG. 1. In addition, the drawings are not necessarily drawn to scale but are configured to clearly illustrate the invention.

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as limited to the embodiments set forth herein; rather, these embodiments are provided so that the disclosure will fully convey the scope of the invention to those skilled in the art.

An ACCC Reinforced Cable

Figure 11:
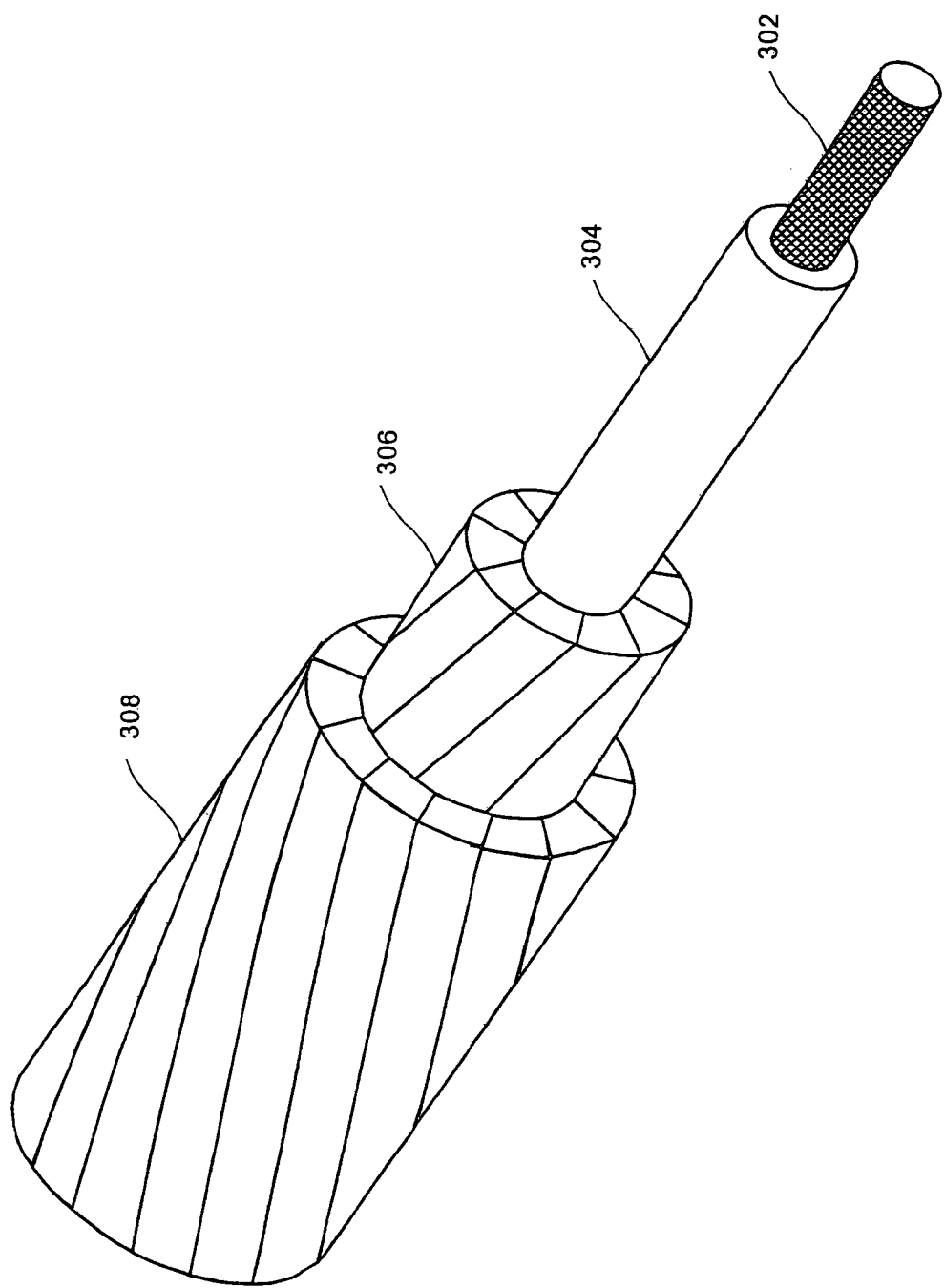
FIG. 11 is a schematic view of one embodiment of an aluminum conductor composite core (ACCC) reinforced cable showing an inner composite core and an outer composite core surrounded by two layers of aluminum conductor according to the invention.

The present invention relates to a reinforced composite core member made from a plurality of fiber reinforcements from one or more fiber types embedded in a matrix. A further embodiment of the invention uses the composite core in an aluminum conductor composite core reinforced (ACCC) cable. These ACCC cables can provide for electrical power distribution wherein electrical power distribution includes distribution and transmission cables. FIG. 11 illustrates an embodiment of an ACCC reinforced cable 300. This one embodiment in FIG. 11 illustrates an ACCC reinforced cable having a carbon fiber reinforcement and epoxy resin composite inner core 302 and a glass fiber reinforcement and epoxy resin composite outer core 304, surrounded by a first layer of aluminum conductor 306 wherein a plurality of trapezoidal shaped aluminum strands helically surround around the composite core and having a second layer of aluminum conductor 308 wherein a plurality of trapezoidal shaped aluminum strands helically surround around the first aluminum layer 306.

Composite cores of the present invention can comprise the following characteristics: at least one type of fiber, variable relative amounts of each fiber type, fiber types of substantially small diameter, fiber types of a substantially continuous length, composite cores having a high packing density, fiber tows having relative spacing within the packing density, a fiber to resin volume fraction 60% or lower, a fiber to resin weight fraction 72% or lower by weight, adjustable volume fraction, substantially low coefficient of thermal expansion, a substantially high tensile strength, ability to withstand a substantially high range of operating temperatures, ability to withstand substantially low ambient temperatures, having the potential to customize composite core resin properties, substantially high dielectric properties, having the potential of a plurality of geometric cross section configurations, and sufficient flexibility to permit winding of continuous lengths of composite core.

A composite core of the following invention can have a tensile strength above 160 Ksi, and more preferably within the range of about 160 Ksi to about 380 Ksi; a modulus of elasticity above 7 Msi, and more preferably within the range of about 7 Msi to about 37 Msi; an operating temperature capability above $-45°$ C., and more preferably within the range of about $-45°$ C. to about $230°$ C.; and, a coefficient of thermal expansion below $6 \times 10^{-6}$ m/m/$°$ C., and more preferably within the range of about $-0.7 \times 10^{-6}$ m/m/$°$ C. to about $6 \times 10^{-6}$ m/m/$°$ C.

To achieve a composite core in the above stated ranges, different matrix materials and fiber types may be used. The matrix and the fiber properties are explained further below. First, matrix materials embed the fibers. In other words, the matrix bundles and holds the fibers together as a unit—a load member. The matrix assists the fibers to act as a single unit to withstand the physical forces on the ACCC cable. The matrix material may be any type of inorganic or organic material that can embed and bundle the fibers into a composite core. The matrix can include, but is not limit to, materials such as glue, ceramics, metal matrices, resins, epoxies, foams, elastomers, or polymers. One skilled in the art will recognize other materials that may be used as matrix materials.

While other materials may be used, an exemplary embodiment of the invention uses epoxy resins. Throughout the remainder of the invention the term resin or epoxy may be used to identify the matrix. However, the use of the terms epoxy and resin are not meant to limit the invention to those embodiments, but all other types of matrix material are included in the invention. The composite core of the present invention may comprise resins having physical properties that are adjustable to achieve the objects of the present invention. The present invention may use any suitable resin. Suitable resins may include thermosetting resins, thermoplastic resins or thermoplastically modified resins, toughened resins, elastomerically modified resins, multifunctional resins, rubber modified resins, Cyanate Esters, or Polycyanate resins. Some thermosetting and thermoplastic resins may include, but are not limited to, phenolics, epoxies, polyesters, high-temperature polymers (polyimides), nylons, fluoropolymers, polyethelenes, vinyl esters, and the like. One skilled in the art will recognize other resins that may be used in the present invention.

Depending on the intended cable application, suitable resins are selected as a function of the desired cable properties to enable the composite core to have long term durability at high temperature operation. Suitable resins may also be selected according to the process for formation of the composite core to minimize friction during processing, to increase processing speed, and to achieve the appropriate fiber to resin ratio in the final composite core.

The composite core of the present invention comprises resins having good mechanical properties and chemical resistance. These resins may be able to function with prolonged environmental exposure for at least about 60 years of usage. More preferably, the composite core of the present invention can comprise resins having good mechanical properties and chemical resistance at prolonged exposure for at least about 70 years of usage. Further, the composite core of the present invention comprises resins that may operate anywhere above $-45°$ C. and possibly up to $230°$ C. More preferably, the resin can operate well around $180°$ C. or above.

An embodiment of an epoxy system may include a low viscosity multifunctional epoxy resin using an anhydride hardener and an imidazol accelerator. An example of this type of epoxy system may be the Araldite® MY 721/Hardener 99-023/Accelerator DY 070 hot curing epoxy matrix system by Vantico Inc. and specified in the like titled data sheet dated September 2002. The resin has a chemical description of N,N,N',N'-Tetraglycidyl-4,4'-methylenebisbenzenamine. The hardener is described as 1H-Imidazole, 1-methyl-1-Methylimidazole. This exemplary resin epoxy system can have the following properties: a tensile elongation around 1.0% to 1.5%; a flexural strength around 16.5 Kpsi to 19.5 Kpsi; a tensile strength around 6.0 Kpsi to 7.0 Kpsi; a tensile modulus around 450 Kpsi to 500 Kpsi; a flexural elongation around 4.5% to 6.0%. Another embodiment of an epoxy resin system may be a multifunctional epoxy with a cycloaliphatic-amine blend hardener. An example of this type of epoxy system may be the JEFFCO 1401-16/4101-17 epoxy system for infusion by JEFFCO Products Inc. and specified in the like titled data sheet dated July 2002. This exemplary resin epoxy system can have the following properties: a Shore D Hardness around 88D; an ultimate tensile strength of 9,700 pounds; an elongation at tensile strength around 4.5% to 5.0%; an ultimate elongation around 7.5% to 8.5%; a flexural strength around 15.25 Kpsi; and an ultimate compressive strength around 14.5 Kpsi. These embodiments of the epoxy resin system are exemplary and are not meant to limit the invention to these particular epoxy resin systems. One skilled in the art will recognize other epoxy systems that will produce composite cores within the scope of this invention.

The composite core of the present invention can comprise a resin that is tough enough to withstand splicing operations without allowing the composite body to crack. The composite core of the present invention can comprise resins having a neat resin fracture toughness above 0.87 INS-lb/in and possible up to about 1.24 INS-lb/in.

The composite core of the present invention can comprise a resin having a low coefficient of thermal expansion. A low coefficient of thermal expansion reduces the amount of sag in the resulting cable. A resin of the present invention may have a coefficient of thermal expansion below about $4.2 \times 10^{-5}$ m/m/° C. and possibly lower than $1.5 \times 10^{-5}$ m/m/° C. The composite core of the present invention can comprise a resin having an elongation greater than about 2.1% or more preferably greater than 4.5%.

Second, the composite core comprises a plurality of fiber reinforcements from one or more fiber types. Fiber types may be selected from: carbon (graphite) fibers—both HM and HS (pitch based), Kevlar fibers, basalt fibers, glass fibers, Aramid fibers, boron fibers, liquid crystal fibers, high performance polyethylene fibers, or carbon nanofibers or nanotubes. Several types of carbon, boron, Kevlar and glass fibers are commercially available. Each fiber type may have subtypes that can be variously combined to achieve a composite with certain characteristics. For instance, carbon fibers may be any type from the Zoltek Panex®, Zoltek Pyron®, Hexcel, or Thornel families of products. These carbon fibers may come from a PAN Carbon Fiber or a Polyacrylonitrile (PAN) Precursor. There are hundreds of different types of carbon fibers, and one skilled in the art would recognize the numerous carbon fibers that may be used in the present invention. There are also numerous different types of glass fibers. For instance, an A-Glass, B-Glass, C-Glass, D-Glass, E-Glass, S-Glass, AR-Glass, or R-Glass may be used in the present invention. Fiberglass and paraglass may also be used. As with carbon fibers, there are hundreds of different types of glass fibers, and one skilled in the art would recognize the numerous glass fibers that may be used in the present invention. It is noted that these are only examples of fibers that may meet the specified characteristics of the invention, such that the invention is not limited to these fibers only. Other fibers meeting the required physical characteristics of the invention may be used. One skilled in the art will recognize other fibers that may be used in the present invention. In addition, examples of cores using carbon and glass fibers will be explained. These descriptions are not meant to limit the invention to those fiber types. Rather, one skilled in the art will recognize from the description that other fibers may be used in the invention, and those different fibers may have similar or different properties depending on the desired composite core.

To achieve these physical characteristics, composite cores in accordance with the present invention may comprise only one type of fiber. The composite core may be a uniform section or layer that is formed from one fiber type and one matrix type. For instance, the composite core may be a carbon fiber embedded in resin. The core may also be a glass fiber embedded in a polymer, and the core may also be basalt embedded in a vinyl ester. However, most cables, within the scope of this invention, may comprise at least two distinct fiber types.

The two fiber types may be general fiber types, fiber classes, fiber type subtypes, or fiber type genera. For instance, the composite core may be formed using carbon and glass. Yet, when an embodiment mentions two or more fiber types, the fiber types need not be different classes of fibers, like carbon and glass. Rather, the two fiber types may be within one fiber class or fiber family. For instance, the core may be formed from E-glass and S-glass, which are two fiber types or fiber subtypes within the glass fiber family or fiber class. In another embodiment, the composite may comprise two types of carbon fibers. For instance, the composite may be formed from IM6 carbon fiber and IM7 carbon fiber. One skilled in the art will recognize other embodiments that would use two or more types of fibers.

The combination of two or more fiber types into the composite core member offers substantial improvements in strength to weight ratio over materials, such as steel, commonly used for cables in an electrical power transmission and distribution system. Combining fiber types also may allow the composite core to have sufficient stiffness and strength but maintain some flexibility.

Composite cores of the present invention may comprise fiber tows having relatively high yield or small K numbers. A fiber tow is a bundle of continuous microfibers, wherein the composition of the tow is indicated by its yield or K number. For example, a 12K carbon tow has 12,000 individual microfibers, and a 900 yield glass tow has 900 yards of length for every one pound of weight. Ideally, microfibers wet out with resin such that the resin coats the circumference of each microfiber within the bundle or tow. Wetting may be affected by tow size, the number of microfibers in the bundle, and also by individual microfiber size. Larger tows are more difficult to wet around individual fibers in the bundle due to the number of fibers contained within the bundle. Smaller fiber diameter increases the distribution of resin around each fiber within each fiber tow. Wetting and infiltration of the fiber tows in composite materials is of critical importance to the performance of the resulting composite. Incomplete wetting results in flaws or dry spots within the fiber composite that reduce strength and durability of the composite product. Fiber tows may also be selected in accordance with the size of fiber tow that the process can handle.

One process for forming composite cores in accordance with the present invention is called the B-stage forming process. Fiber tows of the present invention for carbon may be selected from 2K and up, but more preferably from about 4K to about 50K. Glass fiber tows may be 50 yield and up, but more preferably from about 115 yield to about 1200 yield.

For glass fibers, individual fiber size diameters in accordance with the present invention may be below 15 µm, or more preferably within the range of about 8 µm to about 15 µm, and most preferably about 10 µm in diameter. Carbon fiber diameters may be below 10 µm, or more preferably within the range of about 5 µm to about 10 µm, and most preferably about 7 µm. For other types of fibers, a suitable size range is determined in accordance with the desired physical properties. The ranges are selected based on optimal wet-out characteristics and feasibility of use. For example, fibers less than about 5 µm are so small in diameter that they pose certain health risks to those that handle the fibers. In contrast, fibers approaching 25 μm in diameter are difficult to work with because they are stiffer and more brittle.

Composite cores of the present invention may comprise fiber tows that are substantially continuous in length. In practice, carbon fiber tows comprising the present invention may be between about 1000 and 3000 meters in length, depending on the size of the fiber spool. However, glass fiber lengths can be up to 36 km in length. It is most preferable to select the longest fibers that the processing equipment will accommodate due to less splicing of fibers to form a continuous composite core. When the material on a fiber tow spool ends, fiber ends may be glued or mechanically connected end-to-end forming a substantially continuous fiber tow length.

Composite cores of the present invention may comprise fibers having a high packing efficiency relative to prior art cores, such as steel, for conductor cables. Traditional steel conductor cables generally comprise several round steel wires. Due to the round shape of the wires, the wires cannot pack tightly together and can only achieve a maximum packing efficiency of about 74%. The only way that a steel core could have 100% packing efficiency would be to have a solid steel rod as opposed to several round steel wires. Using a solid steel rod is not possible because the final cable would be inflexible. The steel rod would bend slightly to the point of yield, which may only be a few inches. However, if the rod is bent past the point of yield, it will remain bent and not return to its original shape. In the present invention, individual fibers can be oriented, coated with resin, and cured to form a composite core member having 100% packing efficiency. Higher packing efficiency yields a composite core with strength that is greater for a given volume than a steel core. In addition, higher packing efficiency allows for formation of a composite core with a smaller diameter. The smaller diameter core can allow an increased amount of aluminum conductor material to be wrapped around the composite core without changing the outside diameter of the conductor.

Composite cores of the present invention can comprise fiber types that are substantially heat resistant. Higher operating temperatures occur when higher amperage is sent through a conductor during increased demand periods. Heat resistant fiber types enable an ACCC cable to operate at higher operating temperatures. An ACCC cable may transmit the higher amperages that can cause the higher conductor temperatures. The fiber types in the present invention may withstand operating temperatures above −45° C. and may possibly withstand temperatures as high as 230° C. More preferably, the fibers in the present invention have the ability to withstand operating temperatures above 100° C., and most preferably, withstand temperatures around 180° C. or above. Moreover, fiber types in the present invention can withstand an ambient temperature above −45° C. and more preferably within the range between about −45° C. to about 90° C. That is, under no load conditions, the composite core may be able to withstand temperatures as low as about −45° C. without suffering impairment of the core's physical characteristics.

A relative amount of each type of fiber can vary depending on the desired physical characteristics of the composite core. For example, fibers having a higher modulus of elasticity enable formation of a high strength and high-stiffness composite core. As an example, carbon fibers have a modulus of elasticity from 15 Msi and up, but more preferably, from about 22 Msi to about 37 Msi; glass fibers are considered low modulus fibers having a modulus of elasticity from 3 Msi and up. As one skilled in the art will recognize, other fibers may be chosen that can achieve the desired physical properties for the composite core.

Composite cores of the present invention can comprise fibers having relatively high tensile strengths. The degree of sag in an overhead voltage power transmission cable varies as the square of the span length and inversely with the tensile strength of the cable. An increase in the tensile strength can effectively reduce sag in an ACCC cable. As an example, carbon or graphite fibers may be selected having a tensile strength above 350 Ksi and more preferably within the range of about 350 Ksi to about 750 Ksi, but most preferably, within the range between 710 Ksi to 750 Ksi. Also as an example, glass fibers can be selected having a tensile strength above 180 Ksi, and more preferably within the range of about 180 Ksi to about 220 Ksi. The tensile strength of the composite core can be adjusted by combining glass fibers having a lower tensile strength with carbon fibers having a higher tensile strength. The properties of both types of fibers may be combined to form a new cable having a more desirable set of physical characteristics.

Composite cores of the present invention can have various fiber to resin volume fractions. The volume fraction is the area of fiber divided by the total area of the cross section. A composite core of the present invention may comprise fibers embedded in a resin having at least a 50% volume fraction. The fiber to resin ratio affects the physical properties of the composite core member. In particular, the strength, electrical conductivity, and coefficient of thermal expansion are functions of the fiber to resin volume. Generally, a higher volume fraction of fibers in the composite results in a higher tensile strength for the resulting composite. The weight of the fiber will determine the ratio of fiber to resin by weight. In accordance with the invention, the more preferred volume fraction of fiber to resin composite is 60% or lower or most preferably from about 50% to about 60%. The volume fraction can be adjusted to yield a fiber to resin ratio of 72% or lower by weight, or more preferably from 65% to 72%, and most preferably 65% by weight.

Any layer or section of the composite core may have a different fiber to resin ratio by weight relative to the other layers or sections. These differences may be accomplished by selecting the choosing an appropriate number of fibers for the appropriate resin type to achieve the desired fiber to resin ratio. For example, a composite core member having a carbon fiber and epoxy layer surrounded by an outer glass and epoxy layer may comprise 126 spools of glass fiber and an epoxy resin having a viscosity of about 2000 cPs to about 6000 cPs at 50° C. This fiber to resin selection can yield a fiber to resin ratio of about 75/25 by weight. Preferably, the resin may be modified to achieve the desired viscosity for the forming process. The exemplary composite may also have 16 spools of carbon fiber and an epoxy resin having a viscosity of about 2000 cPs to about 6000 cPs at 50° C. This selection can yield a fiber to resin ratio of about 70/30 by weight. Changing the number of spools of fiber changes the fiber to resin by weight ratio, and thereby can change the physical characteristics of the composite core. Alternatively, the resin may be adjusted to increase or decrease the resin viscosity to improve wetting.

Composite cores may have various geometries. Some of the different embodiments of the various geometries will be explained below. However, the invention is not limited to these embodiments of the geometries. First, fibers may have various alignments or orientations. Continuous towing can longitudinally orient the fibers along the cable. The core may have a longitudinal axis running along the length of the cable. In the art, this longitudinal axis is referred to as the 0° orientation. In most cores, the longitudinal axis runs along the center of the core. Fibers can be arranged to parallel this longitudinal axis; this orientation is often referred to as a 0° orientation or unidirectional orientation. However, other orientations may be possible.

The fibers in the composite core may be arranged in various ways within the core. Besides the 0° orientation, the fibers may have other arrangements. Some of the embodiments may include off-axis geometries. One embodiment of the composite core may have the fibers helically wound about the longitudinal axis of the composite core. The winding of the fibers may be at any angle from near 0° to near 90° from the 0° orientation. The winding may be in the + and − direction or in the + or − direction. In other words, the fibers may be wound in a clockwise or counterclockwise direction. In an exemplary embodiment, the fibers would be helically wound around the longitudinal axis at an angle to the longitudinal axis. In some embodiments, the core may not be formed in radial layers. Rather, the core may have two or more flat layers that are compacted together into a core. In this configuration, the fibers may have other fiber orientation besides 0° orientation. The fibers may be laid at an angle to the 0° orientation in any layer. Again, the angle may be any angle + or − from near 0° to near 90°. In some embodiments, one fiber or group of fibers may have one direction while another fiber or group of fibers may have a second direction. Thus, the present invention includes all multidirectional geometries. One skilled in the art will recognize other possible angular orientations.

In some other embodiments, the fibers may be interlaced or braided. In this embodiment, one set of fibers may be helically wound in one direction while a second set of fibers is wound in the opposite direction. As the fibers are wound, one set of fibers may change position with the other set of fibers. In other words, the fibers would be woven or crisscrossed. These sets of helically wound fibers also may not be braided or interlaced but may form concentric layers in the core. In another embodiment, a braided sleeve may be placed over the core and embedded in the final core configuration. Also, the fibers may be twisted upon themselves or in groups of fibers. One skilled in the art will recognize other embodiments where the fiber orientation is different. Those different embodiments are included within the scope of the invention.

Other geometries are possible beyond the orientation of the fibers. The composite core may be formed in different layers and sections. A two layered composite core is provided as an example in FIG. 11. Several other core arrangements are possible. First, a composite core formed from more than two layers is possible. A first layer may have a first fiber type and a first type of matrix. Other layers may have different fiber types and different matrices from the first layer. The different layers may be bundled and compacted into a final composite core. As an example, the composite core may consist of a layer made from carbon and epoxy, a glass fiber and epoxy layer, and then a basalt fiber and epoxy layer. In another example, the inner lay may be basalt, followed by a carbon layer, followed by a glass layer, and finally be another basalt layer. All of these different arrangements can produce different physical properties for the composite core. One skilled in the art will recognized the numerous other layer configurations that are possible.

Figure 5:
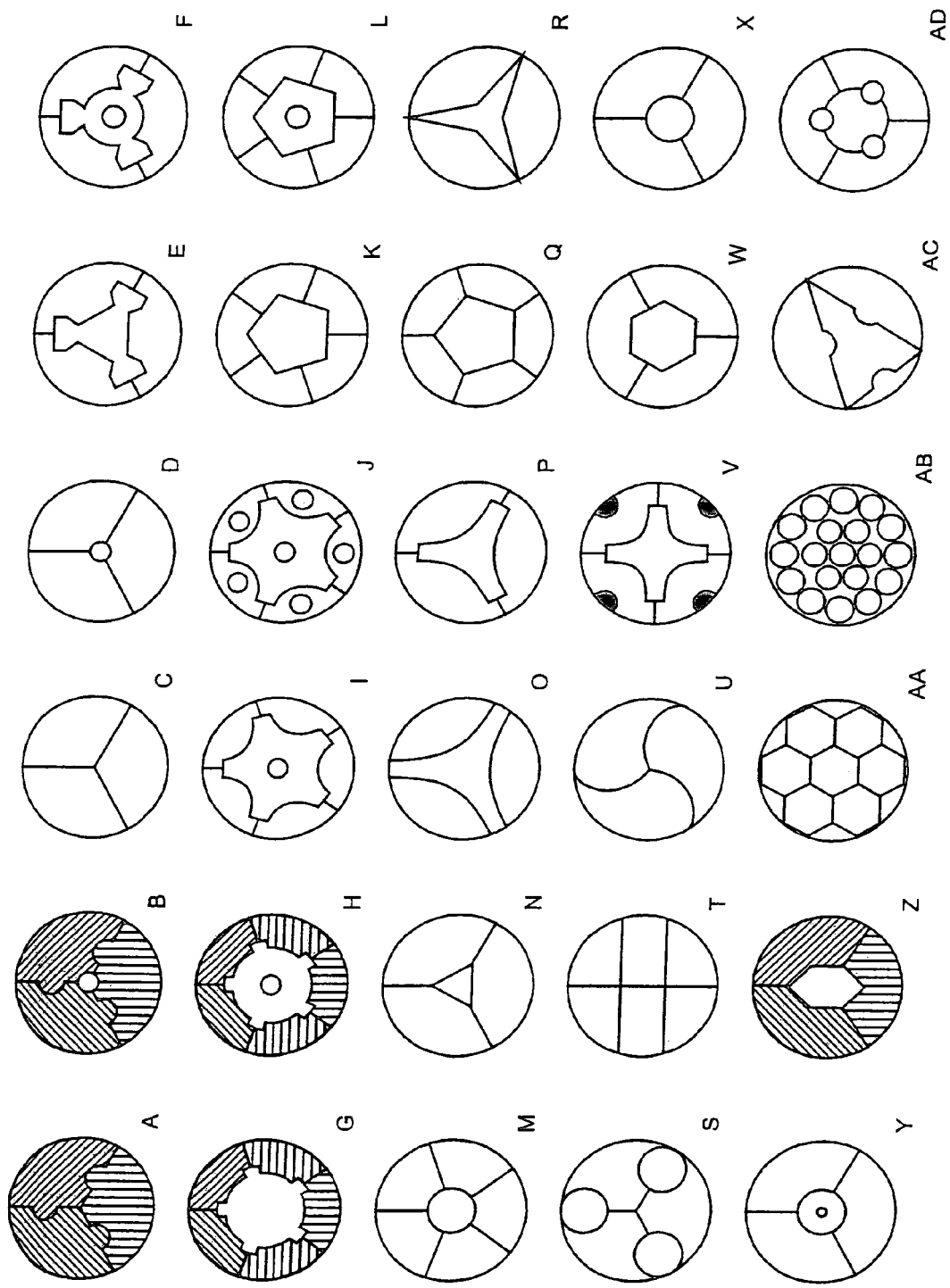
FIG. 5 shows a cross-sectional view of thirty possible composite core cross-section geometries according to the invention.

Still another core arrangement may include different sections in the core instead of layers. FIG. 5 shows numerous possible cross sectional views of these types of composite cores. These cross sections demonstrate that the composite core may be arranged in two or more sections without those sections being layered. Thus, depending on the physical characteristics desired, the composite core can have a first section of core with a certain composite and one or more other sections with a different composite. These sections can each be made from a plurality of fibers from one or more fiber types embedded in one or more types of matrices. The different sections may be bundled and compacted into a final core configuration.

In any of these different arrangements, the layers or sections may have different fibers or different matrices. For example, one section of the core may be a carbon fiber embedded in a thermosetting resin. Another section may be a glass fiber embedded in a thermoplastic section. Each of the sections may be uniform in matrix and fiber type. However, the sections and layers may also be hybridized. In other words, any section or layer may be formed from two or more fiber types. Thus, the section or layer may be, as an example, a composite made from glass fiber and carbon fiber embedded in a resin. Thus, the composite cores of the present invention can form a composite core with only one fiber type and one matrix, a composite core with only one layer or section with two or more fiber types and one or more matrices, or a composite core formed from two or more layers or sections each with one or more fiber types and one or more matrix types. One skilled in the art will recognize the other possibilities for the geometry of the composite core.

As explained above, some embodiments of the composite core may combine two or more types of fibers to take advantage of the inherent physical properties of each fiber type to create different composite cores. For example, two or more fiber type reinforcements may be combined to form a high strength and high stiffness composite core but with added flexibility. Also, the physical characteristics of the composite core may be adjusted by changing the fiber to resin ratio of each component. In one example, the composite core may be 0.1104 sq. in. in cross sectional area for a core of 0.375 inches in diameter and comprise a layer of carbon fiber and a layer of glass fiber. The carbon fiber and matrix section or inner layer may be 0.0634 sq. in. in cross sectional area. The glass fiber and matrix section or layer may be 0.0469 sq. in. in cross sectional area. This composite core may comprise an inner core with a fiber to resin ratio of about 70/30 by weight and an outer layer having a fiber to resin ratio of about 75/25 by weight. This fiber and core arrangement produces a high strength core, which is also flexible. Other fibers and other geometries may produce composite cores with different physical properties.

The physical characteristics of the composite core may also be adjusted by adjusting the area percentage of each component within the composite core member. For example, by reducing the total area of carbon in the composite core mentioned earlier from 0.0634 sq. in. and increasing the area of the glass layer from 0.0469 sq. in, the composite core member product can have reduced stiffness and increased flexibility. Alternatively, a third fiber, for example basalt, may be introduced into the composite core. The additional fiber changes the physical characteristics of the end product. For example, by substituting basalt for some carbon fibers, the core may have increased dielectric properties and a relatively small decrease in core stiffness.

In accordance with the present invention, the composite core is designed based on the desired physical characteristics of an ACCC reinforced cable. An exemplary embodiment is provided below. The composite core can be designed having an inner strengthening core member comprising a high-strength composite surrounded by an outer low-stiffness layer. The high-strength composite can have a greater than 50% volume fraction and mechanical properties exceeding the mechanical properties of glass fibers. The outer layer of low-stiffness composite can have mechanical properties in the range of glass fiber. The mechanical properties of fibers similar to glass fibers can add flexibility to the composite core.

Fibers forming the first layer of a high-strength composite can be selected with a tensile strength within the range of about 350 Ksi to about 750 Ksi; a modulus of elasticity within the range of about 22 Msi to about 37 Msi; a coefficient of thermal expansion within the range of about $-0.7 \times 10^{-6}$ m/m/° C. to about 0 m/m/° C.; a yield elongation percent within the range of about 1.5% to 3%; a dielectric within the range of about 0.31 W/m·K to about 0.04 W/m·K; and a density within the range of about 0.065 lb/in$^3$ to about 0.13 lb/in$^3$.

Fibers forming the outer layer of a low-stiffness layer can have a tensile strength within the range about 180 Ksi to 220 Ksi; a modulus of elasticity within the range of about 6 Msi to 7 Msi; a coefficient of thermal expansion within the range of about $5 \times 10^{-6}$ m/m/° C. to about $10 \times 10^{-6}$ m/m/° C.; a yield elongation percent within the range of about 3% to about 6%; a dielectric within the range of about 0.034 W/m·K to about 0.04 W/m·K; and a density from 0.060 lbs/in$^3$ and up, but more preferably from about 0.065 lbs/in$^3$ to about 0.13 lbs/in$^3$.

The layers may be bundled in a single core. These layers of differing composites form a hybridized composite core. Although other arrangements of the layers are possible, preferably, the layers would be concentric. Thus, the layers form a hybridized, concentric core with two uniform layers each created from one fiber type and one matrix material.

In the exemplary embodiment, the composite core can have the following physical characteristics. The core can have a tensile strength in the range within the range of about 160 Ksi to about 380 Ksi. More preferably, the core has a tensile strength of about 300 Ksi and above. The core can have a modulus of elasticity within the range of about 7 Msi to about 37 Msi, more preferably, about 16 Msi. The core can withstand operating temperature in the range of about $-45°$ C. and possibly up to about 230° C. More preferably, the composite core is able to withstand an operating temperature around 180° C. and above. The composite core can have a coefficient of thermal expansion of about 0 m/m/° C. to about $6 \times 10^{-6}$ m/m/° C., more preferably, about $2.5 \times 10^{-6}$ m/m/° C. A composite core member having an inner layer and an outer layer in accordance with the ranges set forth above can have increased ampacity over other prior art conductor cables of similar diameter by about 1% to about 200%. This ampacity gain may also be achieved even if the prior art cable has a similar conductor configuration.

Sag versus temperature is determined by considering the modulus of elasticity, the coefficient of thermal expansion, the weight of the composite strength member, and the conductor weight. An ACCC cable can achieve ampacity gains and operating temperatures between $-45°$ C. and 230° C. because the higher modulus of elasticity and lower coefficient of thermal expansion in the composite cores. To design an ACCC cable with increased ampacity ability, the composite core should prevent sag at the higher operating temperatures that may accompany ampacity gains. Sag versus temperature calculations require input of the modulus of elasticity, coefficient of thermal expansion, the weight of the composite strength member, and the conductor weight. Accordingly, these physical characteristics are taken into account in designing the composite core. The composite core of the present invention can have both a high modulus of elasticity and a low coefficient of thermal expansion. Also, the fibers can have high dielectric properties. Thus, an ACCC cable of the present invention can operate at higher operating temperatures without a corresponding increase in sag.

As another example of the composite core, it may be feasible to make a composite core comprising interspersed high modulus of elasticity fibers and low modulus of elasticity fibers. Depending on the strain to failure ratio, this type of core may be a single section or layer of hybridized composite or it may be formed in several sections of single fiber composite. Carbon fibers can be selected for their high modulus of elasticity within the range of about 22 Msi to about 37 Msi, a low coefficient of thermal expansion within the range of about $-0.7 \times 10^{-6}$ m/m/° C. to about 0 m/m° C., and an elongation percent within the range of about 1.5% to about 3%. Glass fibers are selected for a low modulus of elasticity, a low coefficient of thermal expansion within the range of about $5 \times 10^{-6}$ m/m/° C. to about $10 \times 10^{-6}$ m/m/° C., and an elongation percent within the range of about 3% to about 6%. The strain capability of this exemplary composite is a function of the inherent physical properties of the components and the volume fraction of components. In accordance with the present invention, the resins can be customized to achieve certain properties for processing and to achieve desired physical properties in the end product. As such, the fiber and customized resin strain to failure ratio can be determined. For example, carbon fiber and epoxy has a strain to failure ratio of 2.1% and glass fiber and epoxy has a strain to failure ratio of 1.7%. Accordingly, the composite core can be designed to have the stiffness of the carbon fiber and epoxy and the flexibility of the glass fiber and epoxy. This combination of fibers and resin can create a composite core that is flexible and has a low coefficient of thermal expansion.

Alternatively, another high-strength composite having mechanical properties in excess of glass fiber could be substituted for at least a portion of the carbon fibers and another fiber having the mechanical property range of glass fiber could be substituted for glass fiber. For example, basalt has the following properties: a high tensile strength in the range of about 701.98 Ksi (compared to the range of about 180 to about 500 Ksi for glass fibers), a high modulus of elasticity in the range of about 12.95 Msi, a low coefficient of thermal expansion in the range of about 8.0 ppm/C (compared to about 5.4 ppm/C for glass fibers), and an elongation percent in the range of about 3.15% (compared the range of about 3% to about 6% for glass fibers). The basalt fibers can provide increased tensile strength, a modulus of elasticity between carbon and glass fiber, and an elongation percent close to that of carbon fibers. A further advantage is that basalt has superior dielectric properties to carbon. The composite core can comprise an inner strength member that is non-conductive. By designing a high-strength composite core having fibers of inherent physical characteristics surrounded by low modulus fiber outer core, a new property set for the composite core is obtained.

The composite core may also include other surface applications or surface treatments to the composite core. For instance, the composite core may include any chemical or material application to the core that protects the core from environmental factors, protects the core from wear, or prepares the core for further processing. Some of these types of treatments may include, but are not limited to, gel coats, protective paintings, finishes, abrasive coatings, or the like.

Some of the material applications may include, but are not limited to, surface veils applied to the core, mats applied to the core, or protective or conductive tapes wrapped around the core. The tape may include dry or wet tapes. The tapes may include, but are not limited to, paper or paper-product tapes, metallic tape (like aluminum tape), polymeric tapes, rubber tapes, or the like. Any of these products may protect the core from environmental forces like moisture, heat, cold, UV radiation, or corrosive elements. Other applications and treatments to the core will be recognized by one skilled in the art and are included in the present invention.

The final ACCC reinforced cable is created by surrounding the composite core with an electrical conductor. Putting the conductor around the core is explained in more detail below.

Vibration Damping and Mitigation

Another problem occurs in some steel reinforced or metal reinforced cables. Steel reinforced cables require a measure of sag in the cable between consecutive towers or pole structures. The sag in the line allows vibration or sway in the cable, and, in some situations, the sag may be subjected to harmonic vibration, damaging vibration, or excessive swaying in the cable. At certain wind speeds or due to environmental forces, the cable may vibrate at a harmonic frequency or at such force that the cable or the support structures wear or weaken due to stress and strain. Some environmental forces that could cause damaging vibrations may include, but are not limited to, earthquakes, tidal action, wave action, river flow action, nearby automobile traffic, nearby watercraft, or nearby aircraft. One skilled in the art will recognize other forces that may cause damaging vibrations. In addition, one skilled in the art will recognize that harmonic or damaging vibration is a function of the material in the cable, the sag, the length of the span, and the force inducing the vibration.

One particular problem occurs with cable spans across or near railroad tracks. The movement of trains along the railroad tracks and the vibration from powerful diesel engines causes vibrations in the railroad tracks and in the ground around the tracks. The ground vibrations induce vibrations in electrical poles and support structures that hold the electrical cables. The cables in turn vibrate due to the vibrating support structures. In some cases, the vibrations in the cables occur at harmonics that cause violent or damaging vibration and sway. This harmonic or damaging vibration causes stresses in the cable and the support structures. Sag in the ACSR or like cables amplifies the effects of the vibrations. In some instances, the sag allows harmonic vibrations from the trains. The ACCC cable in proximity to the train tracks is not affected by the same vibration effects. Rather, the ACCC cable that runs parallel or near the tracks or that crosses over the tracks can have less line sag. The reduced line sag or the different properties of the composite core reduce, dampen, or lessen the effects of the train caused vibrations.

The present invention helps prevent the harmonic or damaging sway or vibration in electrical cables due to wind or other forces, such as passing trains. First, the ACCC cable may be installed differently due to its increased strength to wight characteristics. The ACCC cable may span distances with less sag. The ACCC cables can be made lighter and stiffer than steel reinforced cables due to the improved properties of the inner core explained above. Thus, the problematic frequencies may be different for an ACCC cable compared to the steel reinforced cable. The sag amount may be changed to adjust the frequencies in the cable that can cause damaging vibration or sway. The cable sag may be lessened to alter the harmonic or damaging frequencies that may be induced in the cable. In addition, cable spans may be changed. Due to the increased strength of some ACCC cables, the distance between poles may be changed to adjust the damaging frequencies. One skilled in the art will recognize other installation possibilities the ACCC cables provide that can help reduce or eliminate vibration or sway, especially harmonic or damaging vibration.

Second, the materials used in the composite core may be adjusted to dampen vibrations within the cable. For instance, an elastomer or other material may be used in a layer, in a section, or as part of the matrix material of the composite core. The presence of the elastomer or other material may function as a dampening component that absorbs the vibrations or dissipates the vibrations. In addition, the fiber types may be adjusted to dampen vibrations. For instance, a more elastic fiber type, such as a polymer fiber, may be used to absorb or dissipate the vibrations. Thus, the composition of the composite core may prevent or mitigate vibration forces. One skilled in the art will recognize other changes to the composite core that may reduce or eliminate vibration or sway, especially harmonic or damaging vibration.

The composite cables made in accordance with the present invention exhibit physical properties wherein these certain physical properties may be controlled by changing parameters during the composite core forming process. More specifically, the composite core forming process is adjustable to achieve desired physical characteristics in a final ACCC cable.

A Method of Manufacture of a Composite Core for an ACCC reinforced Cable

Several forming processes to create the composite core may exist, but an exemplary process is described hereinafter. This exemplary process is a high-speed manufacturing process for composite cores. Many of the processes, including the exemplary process, can be used to form the several different composite cores with the several different core structures mentioned or described earlier. However, the description that follows chooses to describe the high-speed processing in terms of creating a carbon fiber core with a glass fiber outer layer, having unidirectional fibers, and a uniformly layered, concentric composite core. The invention is not meant to be limited to that one embodiment, but encompasses all the modifications needed to use the high-speed process to form the composite cores mentioned earlier. These modifications will be recognized by one skilled in the art.

In accordance with the invention, a multi-phase B-stage forming process produces a composite core member from substantially continuous lengths of suitable fiber tows and heat processible resins. After producing an appropriate core, the composite core member can be wrapped with high conductivity material.

A process for making composite cores for ACCC cables according to the invention is described as follows. Referring to FIG. 1, the conductor core B-stage forming process of the present invention is shown and designated generally by reference number 10. The B-stage forming process 10 is employed to make continuous lengths of composite core members from suitable fiber tows or rovings and resins. The resulting composite core member comprises a hybridized concentric core having an inner and outer layer of uniformly distributed substantially parallel fibers.

In starting the operation, the pulling and winding spool mechanism is activated to commence pulling. The unimpregnated initial fiber tows, comprising a plurality of fibers extending from the exit end of the cooling portion in zone 9, serve as leaders at the beginning of the operation to pull fiber tows 12 from spools 11 through fiber tow guide 18 and the composite core processing system.

In FIG. 1, multiple spools of fiber tows 12 are contained within a rack system 14 and are provided with the ends of the individual fiber tows 12, leading from spools 11, being threaded through a fiber tow guide 18. The fibers can be unwound, either using tangent pulling or center pulling, but preferably using tangent pulling to prevent twisted fibers. Preferably, a puller 16 at the end of the apparatus pulls the fibers through the apparatus. Each dispensing rack 14 can comprise a device allowing for the adjustment of tension for each spool 11. For example, each rack 14 may have a small brake at the dispensing rack to individually adjust the tension for each spool. Tension adjustment minimizes caternary and cross-over of the fiber when it travels and aids in the wetting process. The tows 12 are pulled through the guide 18 and into a preheating oven 20 that evacuates moisture. The preheating oven 20 uses continuous circular air flow and a heating element to keep the temperature constant. The preheating oven is preferably above 100° C.

The tows 12 are pulled into a wet out system 22. The wet out system may be any process or device that can wet the fibers or impregnate the fibers with resin. Wet out systems may include incorporating the resin in a solid form that will be liquefied during later heating. For instance, a thermoplastic resin may be formed as several fibers. These fibers may be interspersed with the carbon and glass fibers of the exemplary embodiment. When heat is applied to the bundle of fibers, the thermoplastic fibers liquefy or melt and impregnate or wet the carbon and glass fibers. In another embodiment, the carbon and glass fibers may have a bark or skin surrounding the fiber; the bark holds or contains a thermoplastic or other type resin in a powder form. When heat is applied to the fibers, the bark melts or evaporates, the powdered resin melts, and the melted resin wets the fibers. In another embodiment, the resin is a film applied to the fibers and then melted to wet the fibers. In still another embodiment, the fibers are already impregnated with a resin—these fibers are known in the art as pre-preg tows. If the pre-preg tows are used, no wet out tank or device is used. An embodiment of the wet out system is a wet out tank. Hereinafter, a wet out tank will be used in the description, but the present invention is not meant to be limited to that embodiment. Rather, the wet out system may be any device to wet the fibers. The wet out tank 22 is filled with resin to impregnate the fiber tows 12. Excess resin is removed from the fiber tows 12 during wet out tank 22 exit. The fiber tows 12 are pulled from the wet out tank 22 to a secondary system, a B-stage oven 24. The B-stage oven heats the resin to a temperature changing the liquid stage of resin to a semi-cure stage. B-stage cure resin is in a tacky stage which permits the fiber tows 12 to be bent, compacted, bundled, and configured. The tackiness of the resin is controlled mainly by the resin heating temperature, which may come from either the tooling, the fiber, or the oven. Fiber tows 12 separated by the guide 18 are pulled into a second B-stage oven 26 comprising a plurality of consecutive dies to compact and configure the tows 12. Two or more dies may be an implement to compact, to drive air out of the composite, and to shape the fibers into a composite core. An embodiment of the set of dies is a set of bushings. A bushing may be a rigid plate with a plurality of passageways that accept the impregnated fibers. Hereinafter, bushing will be used interchangeably with dies, but the invention is not limited to that one embodiment. In the second B-stage oven 26, the fiber tows 12 are directed through a plurality of passageways provided by the bushings. In an exemplary embodiment, the composite core is made from two sets of fiber tows—inner segments are formed from carbon while the outer segments are formed from glass. The consecutive passageways continually compact and configure the inner fiber tows 12 into the inner composite segments. These inner segments are compacted together to form the inner carbon core. The outer fiber tows are also continually compacted and configured into the outer layer, glass segments. After the inner core is formed, the outer segments may be deposited onto and compacted with the inner core. The compaction of all the segments creates a uniformly distributed, layered, and concentric final composite core with the requisite outside diameter.

Preferably, the composite core member is pulled from the second B-stage oven 26 to a next oven processing system 28 wherein the composite core member is cured and pulled to a next cooling system 30 for cooling. After cooling, the composite core may be pulled to a next oven processing system 32 for post curing at elevated temperature. The post-curing process promotes increased cross-linking within the resin resulting in improved physical characteristics of the composite member. The process generally can allow an interval between the heating and cooling process and the pulling apparatus 36 to cool the product naturally or by convection such that the pulling device 34 used to grip and pull the product will not damage the product. The pulling mechanism pulls the product through the process with precision controlled speed.

Referring now more particularly to FIG. 1, in an exemplary embodiment, the process continuously pulls fiber from left to right of the system through a series of phases referred to herein as zones. Each zone performs a different processing function. In this particular embodiment, the process comprises 9 temperature and compacting zones. The process originates at a series of fiber dispensing racks 14 whereby a caterpuller 34 can continuously pull the fibers 12 through each zone. One advantage to the caterpuller system is that it functions as a continuous pulling system driven by an electrical motor as opposed to the traditional reciprocation system. The caterpuller system uses a system of two belts traveling on the upper and lower portions of the product squeezing the product there between. Accordingly, the caterpuller system embodies a simplified uniform pulling system functioning at precision controlled speed using only one device instead of a multiplicity of interacting parts functioning to propel the product through the process. Alternatively, a reciprocation system may be used to pull the fibers through the process.

The process starts with zone 1. Zone 1 may comprise a type of fiber dispensing system. In one embodiment, the fiber dispensing system comprises two racks 13 each rack containing a plurality of spools 11 containing fiber tows 12. Further, the spools 11 are interchangeable to accommodate varying types of fiber tows 12 depending on the desired properties of the composite core member.

For example, an exemplary composite core member formed by the B-stage forming process comprises a carbon and resin inner core surrounded by a glass and resin outer core layer. Preferably, high strength and high quality carbon is used. The resin also protects the fibers from surface damage, and prevents cracking through a mass of fibers improving fracture resistance. The conductor core B-stage forming process 10 creates a system for pulling the fibers to achieve the optimum degree of bonding between fibers in order to create a composite member with optimal composite properties.

As previously mentioned, the components of the composite core are selected based on desired composite core characteristics. One advantage of the present process is the ability to adjust composite components in order for a composite core to achieve the desired goals of a final ACCC cable. It is preferable to combine types of fibers to combine the physical characteristics of each. Performance can be improved by forming a core with increased strength and stiffness, coupled with a more flexible outer layer. The process can increase the optimal characteristics of the composite by preventing twisting of rovings leading to more uniform wetting and strength characteristics.

For example, in an exemplary embodiment of the composite core member, the composite core comprises glass and carbon. Using the B-stage forming process, the racks 13 may hold 126 spools 11 of glass and 16 spools 11 of carbon. The fiber tows 12 leading from spools 11 are threaded through a fiber tow guide 18 wherein fiber tow passageways are arranged to provide a configuration for formation of a core composite sections having an inner carbon core and outer glass layer. The carbon layer is characterized by high strength and stiffness and is a weak electrical conductor whereas the outer low modulus glass layer is more flexible and non-conductive. Having an outer glass layer provides an outer insulating layer between the carbon and the high conductivity aluminum wrapping in the final composite conductor product.

The fiber dispensing system dispenses fibers from the fiber package pull. Preferably, a tangent pull method may be used because it does not twist the fiber. The center pull method can twist fibers dispensed from the spool. As such, the center pull method can result in an increased number of twisted fibers. Twisted fiber can occasionally lay on top of other twisted fiber and create a composite with spots of dry fiber. It is preferable to use tangent pull method to avoid dry spots and optimize wet out ability of the fibers.

Figure 2:
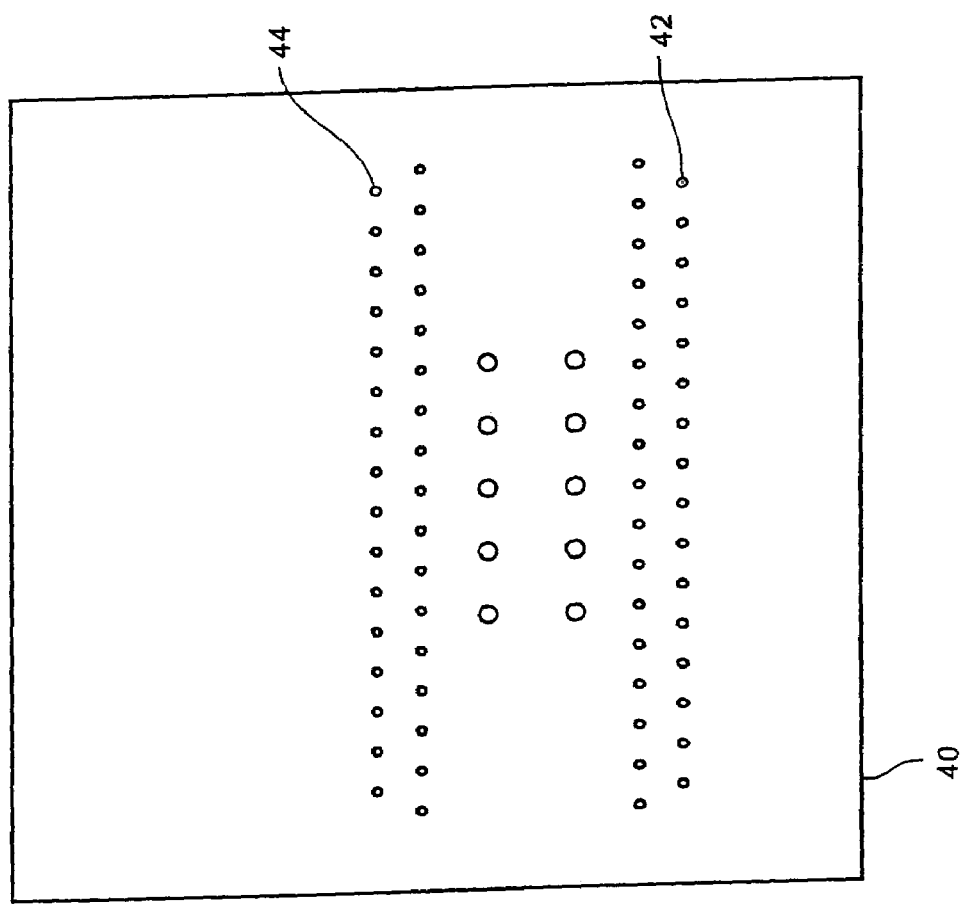
FIG. 2 is a schematic diagram of a bushing showing sufficiently spaced passageways for insertion of the fibers in a predetermined pattern to guide the fibers through the B-stage forming process in accordance with the present invention.

The fiber tows 12 are threaded through a guidance system 18. The guide 18 can comprise polyethylene and steel dies or bushings containing a plurality of passageways in a predetermined pattern guiding the fibers to prevent the fibers from crossing. Referring to FIG. 2, the guide may comprise a bushing with sufficiently spaced passageways for insertion of the fibers in a predetermined pattern. The passageways can be contained within an inner square portion 40. The passageways may be arranged in rows of varying number. The larger diameter carbon fibers can pass through the center two rows of passageways 42 and the smaller diameter glass fibers pass through the outer two rows 44 on either side of the carbon passageways 42. A tensioning device, preferably on each spool, can adjust the tension of the pulled fibers and may assure the fibers are pulled straight through the guide 18.

At least two fibers are pulled through each passageway in the guide 18. For example, a guide 18 comprising 26 passageways pulls 52 fibers through. If a fiber of a pair breaks, a sensing system can alert the composite core B-stage forming process 10 that there is a broken fiber and may stop the puller 34. Alternatively, in one embodiment, a broken fiber can alert the process and the repair can be made without stopping the process. To repair, a new fiber can be pulled from the rack 13 and glued or mechanically coupled or connected to the broken end of the new fiber. After the fiber is repaired, the conductor core B-stage forming machine 10 may be started again.

In an exemplary example, the fibers are grouped in a parallel arrangement for a plurality of rows. For example, in FIG. 2, there are six parallel rows of passageways. The outer two rows comprise 32 passageways, the two inner rows comprise 31 passageways, and the two center rows comprise 4 passageways each. Fibers are pulled at least two at a time into each passageway and pulled into zone 2.

Zone 2 comprises an oven processing system that preheats the dry fibers to evacuate any moisture. The fibers of the present invention may be heated within the range of about 150° F. to 300° F. to evaporate moisture.

Figure 9:
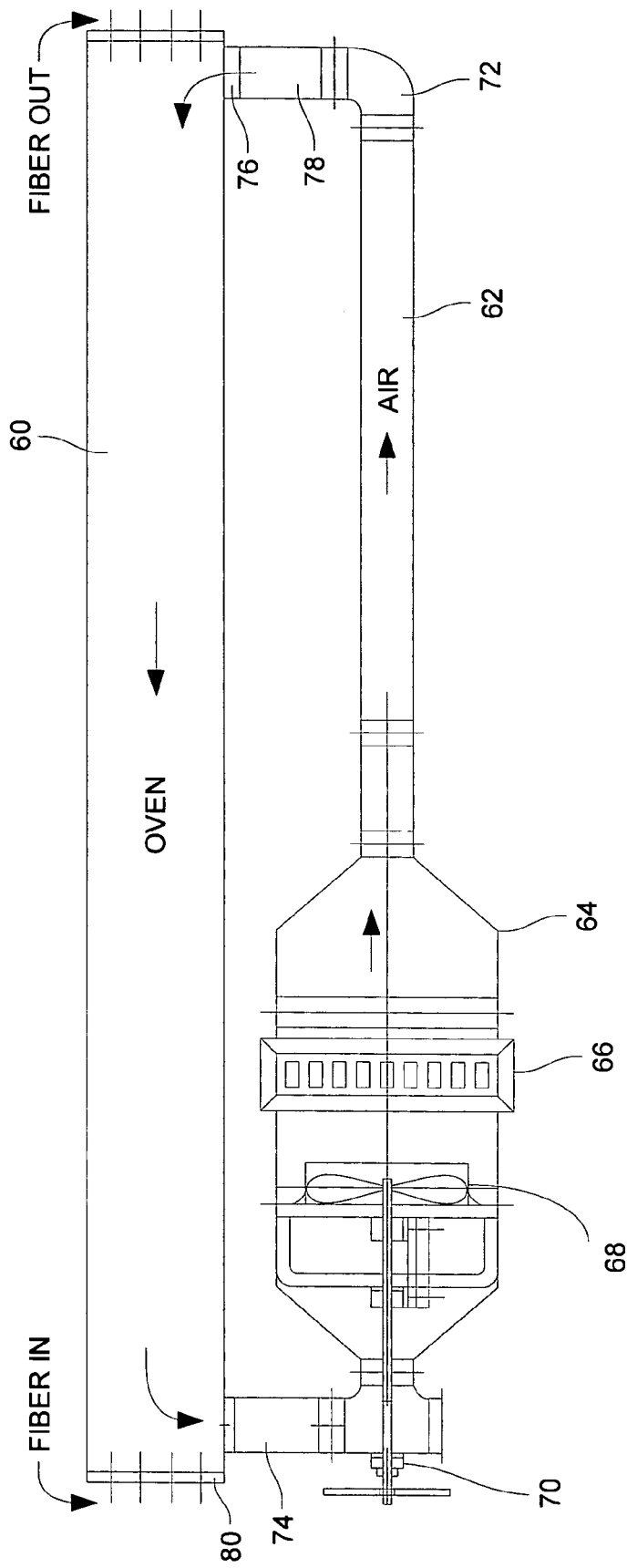
FIG. 9 is a schematic view of an oven process having cross circular air flow to keep the air temperature constant in accordance with the invention.

The oven processing system comprises an oven portion wherein the oven portion is designed to promote cross-circular air flow against the flow of material. FIG. 9 illustrates a typical embodiment of the oven system. An oven is generally designated 60. The fibers pass through the oven from upstream to downstream direction, the air passes in the reverse direction. The oven processing system comprises an air-heating drive system housing 64 that houses a blower 68, powered by electric motor 70, located upstream from a heater assembly 66 to circulate air in a downstream direction through an air flow duct 62. The heat drive system housing houses a blower 68 upstream of the heater assembly 66. The blower 68 propels air across the heater assembly 66 and through the oven system. The air flows downstream to a curved elbow duct 72. The curved elbow duct 72 shifts the air flow 90 degrees up into an inlet duct 78 and through the oven inlet 76. Through the inlet, the air flow shifts 90 degrees to flow upstream through the oven 60 against the pull direction of the fibers. At the end of the oven 60, the air flow shifts 90 degrees down through the oven outlet 80 then through the outlet duct 74 then through the blower 68 and back into the heat drive system housing 64. In one embodiment, a valve is placed between the outlet duct 74 and the blower 68. This valve may function to fully or partially restrict the air flow in either direction. In a further embodiment, a louver or vent to the outside air is set between the valve and the blower. The louver can open to let in cooler air from the environment to help cool the over temperature quickly. The motor 70 comprises an electrical motor outside of the heat drive system to prevent overheating. The motor 70 comprises a pulley with a timing belt that moves the bladed blower 68. Preferably, the system is computer controlled allowing continuous air circulation at a desired temperature. More preferably, the process allows for the temperature to change at any time according to the needs of the process.

For example, the computer may sense the temperature is not at the required temperature and can activate or deactivate the heater 66. The blower 68 blows air across the heating element 66 downstream. The system forces the air to travel in a closed loop circle continuously circulating through the oven 60 keeping the temperature constant.

Figure 10:
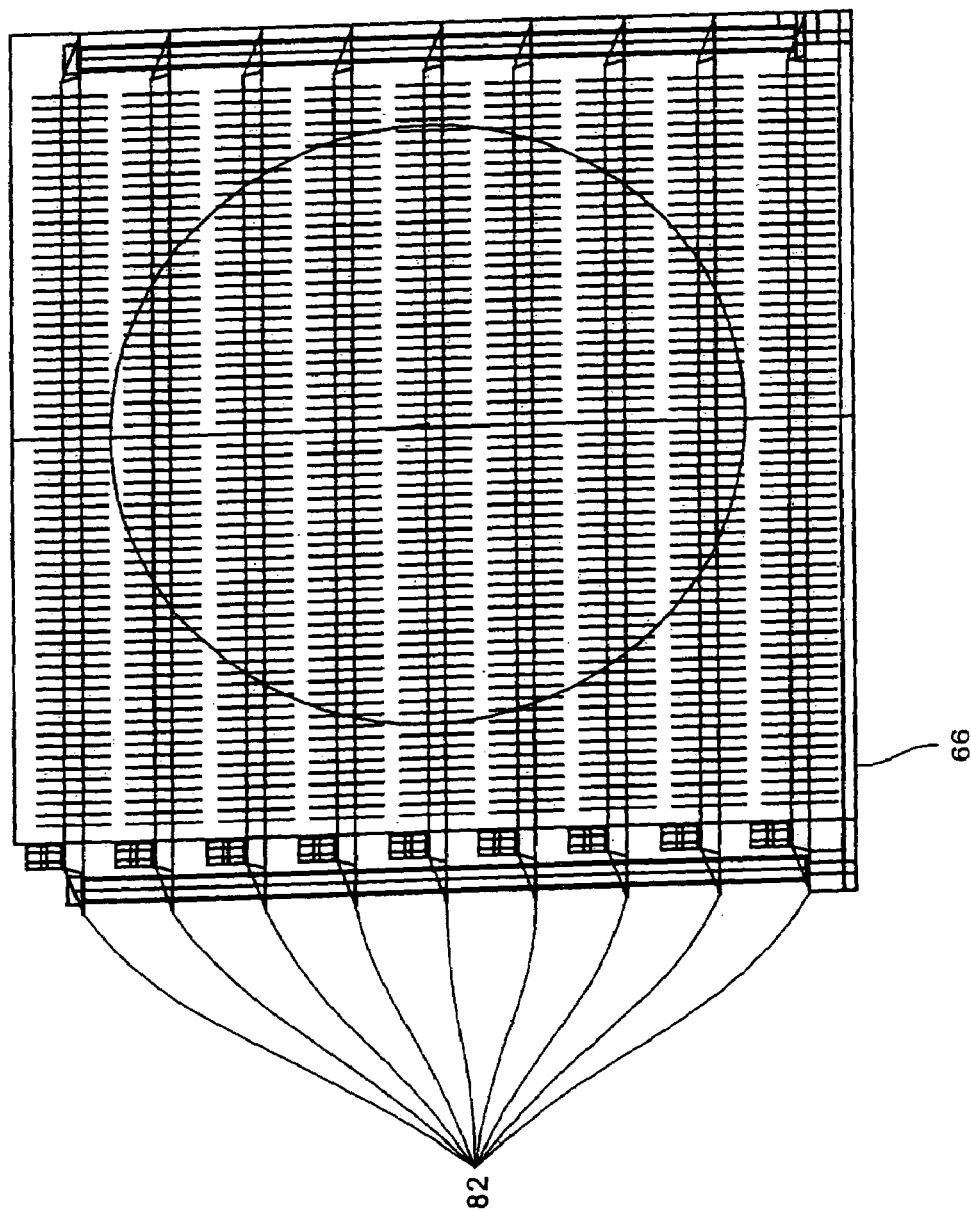
FIG. 10 is a cross-sectional view of the heating element in the oven represented in FIG. 9 showing each heater in the heating element in accordance with the invention.

FIG. 10 is a more detailed view of an exemplary embodiment of the heating element 66. In one embodiment, the heater assembly 66 comprises nine horizontal steel electrical heaters 82. Each heater unit is separate and distinct from the other heater. Each heater unit is separated by a gap. Preferably, after sensing a temperature differential, the computer activates the number of heaters to provide sufficient heat. If the system requires the computer activates one of nine heaters. Alternatively, depending on the needs of the process, the computer activates every other heater in the heater assembly. In another embodiment the computer activates all heaters in the heater assembly. In a further alternative, the computer activates a portion of the heaters in the heater assembly or turns all the heaters off.

In an alternate embodiment, electromagnetic fields penetrate through the process material to heat the fibers and drive off any moisture. In another embodiment pulsed microwaves heat the fibers and drive off any moisture. In another embodiment, an electron beam uses electrons as ionizing radiation to drive off any excess moisture.

In another embodiment, the caterpuller can pull the fibers through zone 3, the fiber impregnation system. Zone 3 comprises a wet out system 22. There are several embodiments of a wet out system. Some of these embodiments will be explained below. However, the present invention is not limited to those described embodiments. In an exemplary embodiment, a pass-through tank is used. The pass-through tank has an enclosed tank where the fiber rovings enter through a bushing at one end of the tank and pass through the resin until exiting another bushing at the other end of the tank. A pass-through tank 22 can contain a device that allows the redirection of fibers during wet out. Preferably, a set of redirection bars may be located in the center of the tank and move the fibers vertically up or down compared to the direction of the pull, whereby the deflection causes the fibers to reconfigure from a round configuration to a flat configuration. The flat configuration allows the fibers to lie side by side and allows for the fibers to be more thoroughly wetted by the resin.

Various alternative techniques well known in the art can be employed to apply or impregnate the fibers with resin. Such techniques include for example, spraying, dipping, reverse coating, brushing, and resin injection. In an alternate embodiment, ultrasonic activation uses vibrations to improve the wetting ability of the fibers. In another embodiment, a dip tank may be used to wet out the fibers. A dip tank has the fibers drop into a tank filled with resin. When the fibers emerge from the tank filled with resin, the fibers are wetted. Still another embodiment may include an injection die assembly. In this embodiment, the fibers enter a pressurized tank filled with resin. The pressure within the tank helps wet the fibers. The fibers can enter the die for forming the composite while still within the pressurized tank. One skilled in the art will recognize other types of tanks and wet out systems that may be used.

Generally, any of the various known resin compositions can be used with the invention. In an exemplary embodiment, a heat curable thermosetting polymeric may be used. The resin may be for example, PEAR (PolyEther Amide Resin), Bismaleimide, Polyimide, liquid-crystal polymer (LCP), vinyl ester, high temperature epoxy based on liquid crystal technology, or similar resin materials. One skilled in the art will recognize other resins that may be used in the present invention. Resins are selected based on the process and the physical characteristics desired in the composite core.

Further, the viscosity of the resin affects the rate of formation. To achieve the desired proportion of fiber to resin for formation of the composite core member, preferably, the viscosity range of the resin is within the range of about 50 Centipoise to about 3000 Centipoise at 20° C. More preferably, the viscosity falls in the range of about 50 Centipoise to about 600 Centipoise at 20° C. The resin is selected to have good mechanical properties and excellent chemical resistance to prolonged environmental exposure of at least 60 years and more preferably, at least 70 years at operation up to about 230° C. A particular advantage of the present invention is the ability for the process to accommodate use of low viscosity resins. In accordance with the present invention, it is preferable to achieve a fiber to resin ratio within the range of 62–75% by weight. It is more preferable to have a fiber to resin ratio within the range of 69–75% by weight. Low viscosity resins will sufficiently wet the fibers for the composite core member. A preferred polymer provides resistance to a broad spectrum of aggressive chemicals and has very stable dielectric and insulating properties. It is further preferable that the polymer meets ASTME595 outgassing requirements and UL94 flammability tests and is capable of operating intermittently at temperatures ranging between 220° C. and 280° C. without thermally or mechanically damaging the strength of the member.

To achieve the desired fiber to resin wetting ratio, the upstream side of the wet out tank can comprises a device to extract excess resin from the fibers. In one embodiment, a set of wipers may be placed after the end of the wet out system, preferably made from steel chrome plated wiping bars. The wipers can be Dr. Blades or other device for removing excess resin.

Alternatively, the wet out tank uses a series of squeeze out bushings to remove excess resin. During the wet out process each bundle of fiber contains as much as three times the desired resin for the final product. To achieve the right proportion of fiber and resin in the cross section of the composite core members, the amount of pure fiber is calculated. The squeeze out bushing or wipers is designed to remove excess resin and control the fiber to resin ratio by volume. For example, where the bushing passageway is twice as big as the area of the cross section of the fiber, a resin to fiber ration by volume of 50% won't be pulled through the bushing, the excess resin will be removed. Alternatively, the bushing and wipers can be designed to allow passage of any ratio of fiber to resin by volume. In another embodiment, the device may be a set of bars that extract the resin. These resin extraction devices may also be used with other wet out systems. In addition, one skilled in the art will recognize other devices that may be used to extract excess resin. Preferably, the excess resin is collected and recycled into the wet out tank 22.

Preferably, a recycle tray extends lengthwise under the wet out tank 22 to catch overflow resin. More preferably, the wet out tank has an auxiliary tank with overflow capability. Overflow resin is returned to the auxiliary tank by gravity through the piping. Alternatively, tank overflow can be captured by an overflow channel and returned to the tank by gravity. In a further alternate, the process can use a drain pump system to recycle the resin back from the auxiliary tank and into the wet out tank. Preferably, a computer system controls the level of resin within the tank. Sensors detect low resin levels and activate a pump to pump resin into the tank from the auxiliary mixing tank into the processing tank. More preferably, there is a mixing tank located within the area of the wet out tank. The resin is mixed in the mixing tank and pumped into the resin wet out tank.

The pullers pull the fibers from zone 3 to zone 4, the B-stage zone. Zone 4 comprises an oven processing system 24. Preferably, the oven processing system is an oven with a computer system that controls the temperature of the air and keeps the air flow constant wherein the oven is the same as the oven in zone 2.

The pullers pull the fibers from zone 3 to zone 4. The oven circulates air in a circular direction downstream to upstream by a propeller heating system. The computer system controls the temperature to heat the wet fiber to B-stage. Preferably, the process determines the temperature. B-stage temperature of the present invention ranges from within about 150° F. to about 300° F. This temperature is maintained within the range in both the first B-stage oven and the second B-stage oven. One advantage of the B-stage semi-cure process in the present invention is the ability to heat the resin to a semi-cure state in a short duration of time, approximately 1–1.5 minutes during the continuation of the process. The advantage is that the heating step does not affect the processing speed of the system. The B-stage process allows for the further tuning of the fiber to resin ratio by removing excess resin from the wet-out stage. Further, B-stage allows the fiber to resin to be further compacted and configured during the process. Accordingly, the process differs from previous processes that use pre-preg semi-cure. Heating the core can semi-cure the resin and bring it to a tacky stage.

More specifically, in traditional composite processing applications, the wetted fibers are heated gradually to a semi-cure stage. However, the heating process generally takes periods of one hour or longer to reach the semi-cure stage. Moreover, the composite must be immediately wrapped and frozen to keep the composite at the semi-cure stage and prevent curing to a final stage. Accordingly, the processing is fragmented because it is necessary to remove the product from the line to configure the product.

In accordance with the present invention, the B-stage heating is dedicated to a high efficiency commercial application wherein semi-cure is rapid, preferably 1–1.5 minutes during a continuous process. Preferably, the resins are designed to allow rapid B-stage semi-curing that is held constant through the process allowing for shaping and configuring and further compaction of the product.

The pullers pull the fibers from B-stage zone 4 to zone 5 for the formation of the composite core member. Zone 5 comprises a next oven processing system 26 having a plurality of dies. As stated above, this B-stage oven is kept at a temperature from about 150° F. to about 300° F. The dies or bushings function to shape the cross section of the fiber tows 12. Preferably, the bushings are configured in a series comprising a parallel configuration with each other. In an exemplary embodiment, there is a set of seven bushings spaced laterally within the oven processing system 26. Preferably, the spacing of the bushings is adjusted according to the process. The bushings can be spaced equidistance or variable distance from each other.

The series of bushings in zone 5 can minimize friction due to the relatively thin bushings ranging within about 3/8 to about 3/4 inch thick. Minimizing friction aids in maximizing the process speed.

Zones 4, 5 and 6 of the present invention extend within the range of about 30–45 feet. Most preferably, the zones 4, 5 and 6 extend at least 30 feet. The pulling distance and the decreased friction due to thin bushing plates helps the process reach speeds in the range of about 9 ft/min to about 60 ft/min. In an exemplary embodiment, the processing speed is about 20 ft/min. Processing speed is further increased due to the high fiber to resin ratio.

Referring to FIG. 3, for example, the bushings 90 comprise a flat steel plate with a plurality of passageways through which the fiber tows 12 are pulled. The flat plate steel bushing 90 preferably ranges from 3/8 inch to 1/2 inch thick determined by the process. The bushings 90 have relatively thin walls to reduce friction between the die and the fast traveling fiber. The oven is long enough to allow the fiber to stay in the controllable B-stage temperature for a longer period of time. Thus, the length of the oven is related to the speed of processing. The thickness of the bushing 90 is preferably the minimum needed to compact the B-staged package into the final shape.

Preferably, the design and size of the bushings 90 are the same. More preferably, the passageways within each bushing 90 diminish in size and vary in location within each successive bushing 90 in the upstream direction. FIG. 3 illustrates an exemplary embodiment of a bushing 90. The bushing 90 comprises two hooked portions 94 and an inner preferably square portion 92. The inner square portion 92 houses the passageways through which the pulling mechanism pulls the fibers. The outer hooked portions 94 form a support system whereby the set of bushings 90 is placed within the oven in zone 5. The outer hooked portion 94 connects with interlocking long steel beams within the oven that function to support the bushings 90.

Zone 5 comprises a series of numerous consecutive bushings. The bushings have two functions: (1) guide the fiber in the configuration for the final product; and (2) shape and compact the B-staged fibers. In one embodiment, the bushings 90 are placed apart within the oven supported on the hooked structures. The bushings 90 function to continually compact the fibers and form a composite core comprising, in this embodiment, carbon and glass while the process is under appropriate tension to achieve concentricity and uniform distribution of fiber without commingling of fibers. The bushings 90 may be designed to form bundles of a plurality of geometries. For example, FIG. 5 illustrates the variations in cross sections that may be achieved in the composite member. Each cross section results from different bushing 90 designs.

Figure 6:
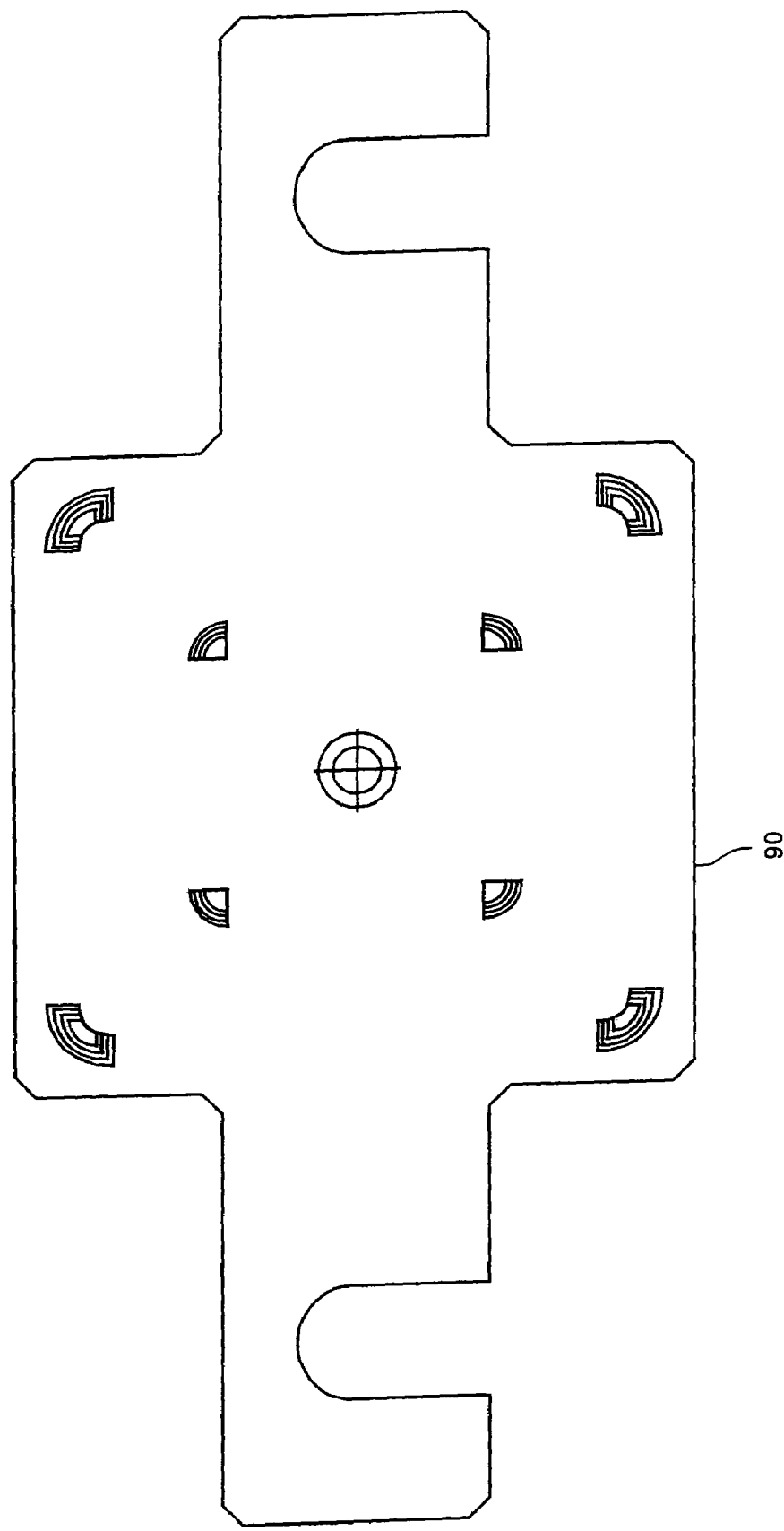
FIG. 6 is a multi-dimensional cross-sectional view of a plurality of bushings overlaid on top of one another showing the decreasing passageway size with respective bushings.

The passageways in each successive bushing 90 diminish in size further compacting the fiber bundles. For example, FIG. 6 shows each bushing 90 superimposed on top of one another. Several changes are apparent with each consecutive bushing 90. First, each overlaid bushing 90 shows that the size of each passageway decreases. Second, the superimposed figure shows the appearance of the center hole for compaction of the core element. Third, the figure shows the movement of the outer corner passageways towards the center position.

Figure 4:
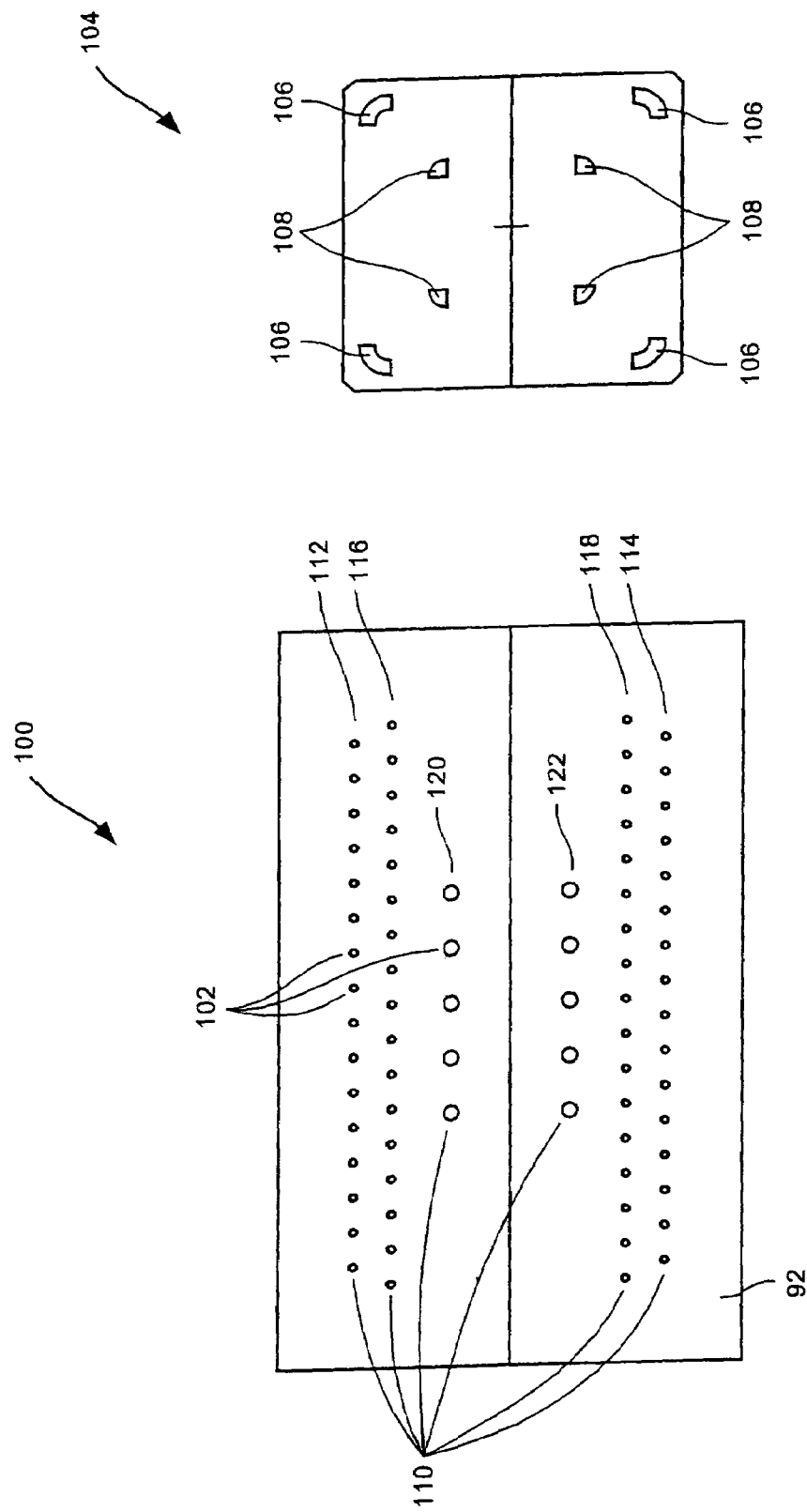
FIG. 4 is schematic comparison of two different bushings showing a reduction in the passageways from one bushing to the next to shape and compact the fibers into bundles in forming the composite core in accordance with the present invention.

Referring to FIG. 4, there are two bushings illustrated. The first bushing 100 illustrated, is in a similar configuration as the guide bushing 18. The second bushing 104 is the first in the series of bushings that function to compact and configure the composite core. The first bushing 100 comprises an inner square portion 92 with a plurality of passageways 102 prearranged through which the fibers are pulled. The passageways 102 are designed to align the fibers into groups in bushing two 104 having four outer groups 106 of fibers and four inner groups 108 of fibers. The inner square portion of the bushing 100 comprises six rows of passageways 110. The arrangement of the passageways 110 may be configured into any plurality of configurations depending on the desired cross section geometry of the composite core member. The top and bottom row, 112 and 114 respectively, contain the same number of passageways. The next to top and next to bottom rows, 116 and 118 respectively, contain the same number of passageways and the two inner rows 120 and 122 contain the same number of passageways.

In an exemplary embodiment, the top and bottom rows contain 32 passageways each. The next level of rows contains 31 passageways each. The middle rows contain 4 passageways each. The pulling mechanism pulls two fibers through each passageway. Referring to FIG. 4 for example, the pulling mechanism pulls 126 glass fibers through rows 112, 114, 116 and 118. Further, the pulling mechanism pulls 16 carbon fibers through rows 120 and 122.

Figure 7:
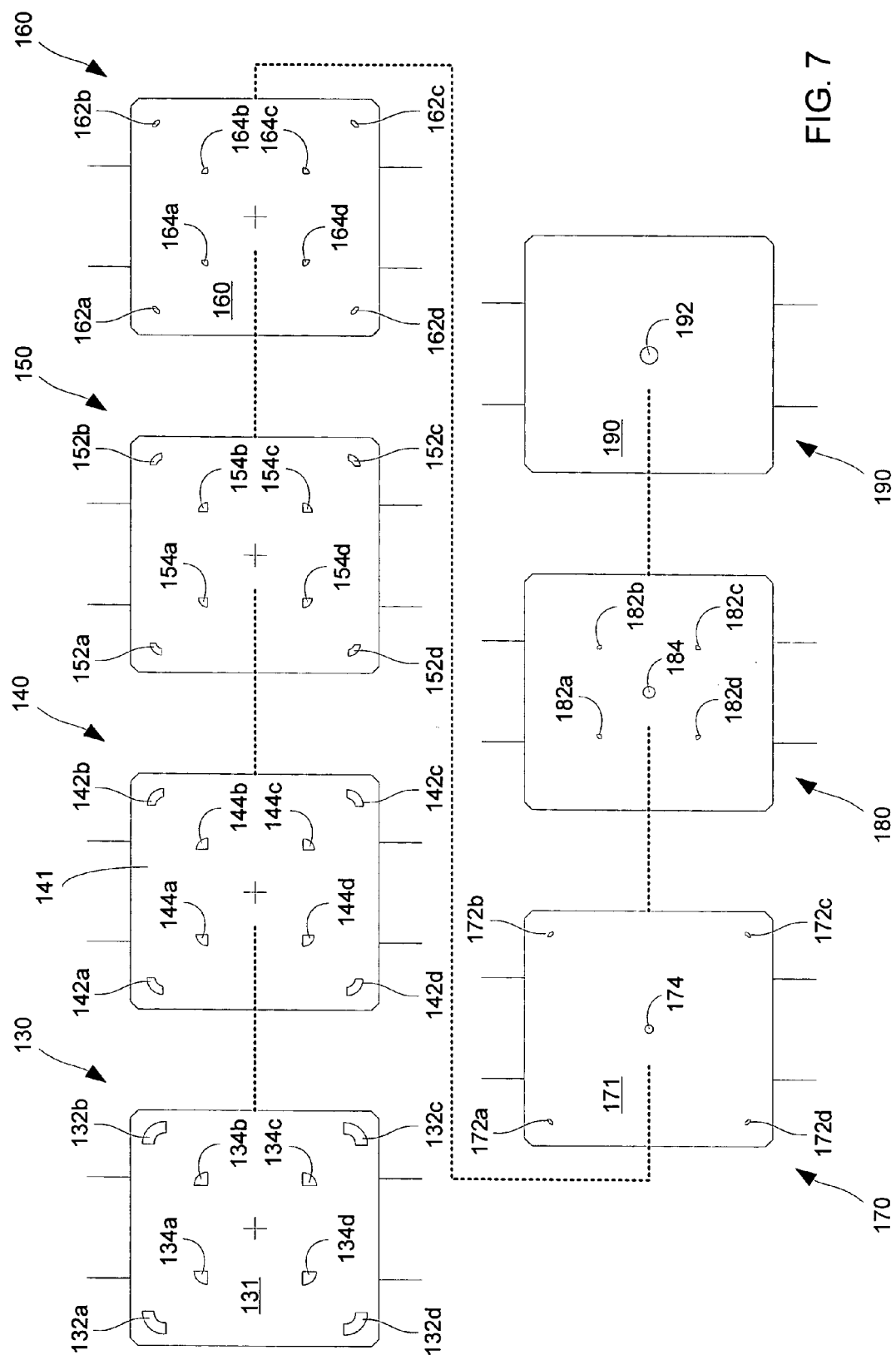
FIG. 7 is a multi-phase schematic view of a plurality of bushings showing migration of the passageways and diminishing size of the passageways with each successive bushing in accordance with the invention.

Referring to FIG. 7, the next bushing, bushing three in the series comprises an inner square portion 131 having four outer corner passageways 132a, 132b, 132c and 132d and four inner passageways 134a, 134b, 134c and 134d. The fibers exit bushing two and are divided into equal parts and pulled through bushing three. Each passageway in bushing three comprises one quarter of the particular type of fiber pulled through bushing two. More specifically, the top two rows of the top and the bottom of bushing two are divided in half whereby the right half of the top two rows of fibers are pulled through the right outer corner of bushing three. The left half of the top two rows of fibers are pulled through the upper left corner 132a of bushing three 130. The right half of the top two rows of fibers are pulled through the upper right corner 132b of bushing three 130. The right half of the bottom two rows of fibers are pulled through the lower right corner 132c of bushing three. The left half of the bottom two rows of fibers are pulled through the lower left corner 132d of bushing three 130. The inner two rows of bushing one are divided in half whereby the top right half of the top middle row of fibers is pulled through the inner upper right corner 134b of bushing three 130. The left half of the top middle row of fibers is pulled through the inner upper left corner 134a of bushing three 130. The right half of the lower middle row of fibers is pulled through the inner lower right corner 134c of bushing three 130. The left half of the lower middle row of fibers is pulled through the inner lower left corner 134d of bushing three 130. Accordingly, bushing three 130 creates eight bundles of impregnated fibers that will be continually compacted through the succeeding bushings.

The puller pulls the fibers through bushing three 130 to bushing four 140. Bushing four 140 comprises the same configuration as bushing three 130. Bushing four 140 comprises a square inner portion 141 having four outer corner passageways 142a, 142b, 142c and 142d and four inner passageways 144a, 144b, 144c and 144d. Preferably, the four outer corner passageways 142a–d and the four inner passageways 144a–d are slightly smaller in size than the similarly configured passageways in bushing three 130. Bushing four 140 compacts the fibers pulled through bushing three.

The puller pulls the fibers from bushing four 140 to bushing five 150. Preferably, the four outer corner passageways 152a, 152b, 152c and 152d and the four inner passageways 154a, 154b, 154c and 154d are slightly smaller in size than the similarly configured passageways in bushing four 140. Bushing five 150 compacts the fibers pulled through bushing four 140.

For each of the successive bushings, each bushing creates a bundle of fibers with an increasingly smaller diameter. Preferably, each smaller bushing wipes off excess resin to approach the optimal and desired proportion of resin to fiber composition.

The puller pulls the fibers from bushing five 150 to bushing six 160. Preferably, the four outer corner passageways 162a, 162b, 162c and 162d and the four inner passageways 164a, 164b, 164c and 164d are slightly smaller in size than the similarly configured passageways in bushing five 150. Bushing six 160 compacts the fibers pulled through bushing five 150.

Bushing seven 170 comprises an inner square 171 having four outer corner passageways 172a, 172b, 172c and 172d and one inner passageway 174. The puller pulls the fibers from the four inner passageways 164 of bushing six 160 through the single inner passageway 174 in bushing seven 170. The process compacts the product to a final uniform concentric core. Preferably, fibers are pulled through the outer four corners 172a, 172b, 172c, 172d of bushing seven 170 simultaneous with compacting of the inner four passageways 164 from bushing six 160.

The puller pulls the fibers through bushing seven 170 to bushing eight 180. The puller pulls the inner compacted core 184 and the outer four corners 182a, 182b, 182c, 182d migrate inwardly closer to the core 184. Preferably, the outer fibers diminish the distance between the inner core and the outer corners by half the distance.

The puller pulls the fibers through bushing eight 180 to bushing nine 190. Bushing nine 190 is the final bushing for the formation of the composite core. The puller pulls the four outer fiber bundles and the compacted core through a passageway 192 in the center of bushing nine 190.

Figure 8:
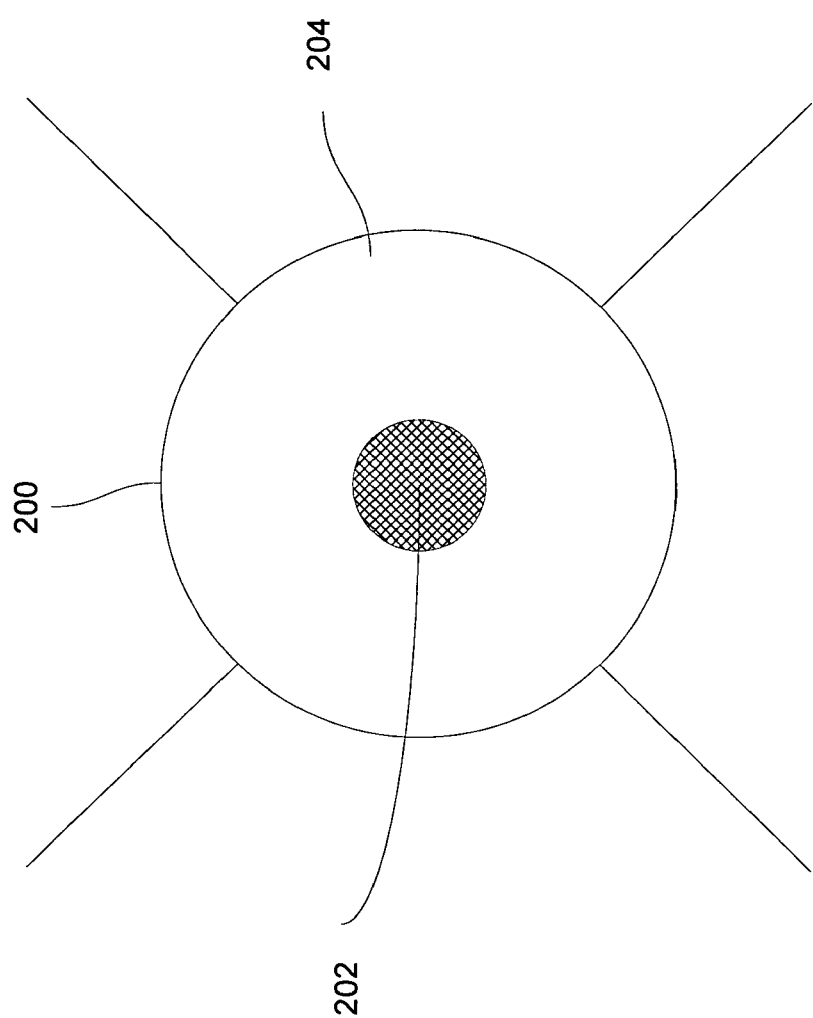
FIG. 8 is a cross sectional view of one embodiment of a composite core according to the invention.

Preferably, bushing nine 190 compacts the outer portion and the inner portion creating an inner portion of carbon and an outer portion of glass fiber. FIG. 8 for example, illustrates a cross-section of a composite cable. The example illustrates a composite core member 200 having an inner reinforced carbon fiber composite portion 202 surrounded by an outer reinforced glass fiber composite portion 204.

Temperature is kept constant throughout zone 5. The temperature is determined by the process and is high enough to keep the resin in a semi-cured state. At the end of zone 5, the product comprises the final level of compaction and the final diameter.

The puller pulls the fibers from zone 5 to zone 6 a curing stage preferably comprising an oven with constant heat and airflow as in zone 5, 4 and 2. The oven uses the same constant heating and cross circular air flow as in zone 5, zone 4 and zone 2. The process determines the curing heat. The curing heat remains constant throughout the curing process. In the present invention, the preferred temperature for curing ranges from about 300° F. to about 400° F. The curing process preferably spans within the range of about 8 feet to about 15 feet. More preferably, the curing process spans about 10 feet in length. The high temperature of zone 6 results in a final cure forming a hard resin. Zone 6 may incorporate a bushing ten to assure that the final fiber composite core member holds its shape. In addition, another bushing prevents blooming of the core during curing.

During the next stages the composite core member product is pulled through a series of heating and cooling phases. The post cure heating improves cross linking within the resin improving the physical characteristics of the product. The pullers pull the fibers to zone 7, a cooling device. Preferably, the mechanical configuration of the oven is the same as in zones 2, 4, 5 and 6. More specifically, the device comprises a closed circular air system using a cooling device and a blower. Preferably, the cooling device comprises a plurality of coils. Alternatively, the coils may be horizontally structured consecutive cooling elements. In a further alternative, the cooling device comprises cooling spirals. The blower is placed upstream from the cooling device and continuously blows air in the cooling chamber in an upstream direction. The air circulates through the device in a closed circular direction keeping the air throughout at a constant temperature. Preferably, the cooling temperature ranges from within about 30° F. to about 180° F.

The pullers pull the composite member through zone 7 to zone 8, the post-curing phase. The composite core member is heated to post-curing temperature to improve the mechanical properties of the composite core member product. The temperature in this oven is kept in the range from about 300° F. to about 400° F.

The pullers pull the composite core member through zone 8 to zone 9, the post curing cooling phase. Once the composite core has been reheated, the composite core is cooled before the puller grabs the compacted composite core. Preferably, the composite core member cools for a distance ranging from about 8 feet to about 15 feet by air convection before reaching the puller. Most preferably, the cooling distance is about 10 feet.

The pullers pull the composite core member through the zone 9 cooling phase into zone 10, a winding system whereby the fiber core is wrapped around a wheel for storage or transportation. It is critical to the strength of the core member that the winding does not over stress the core by bending. In one embodiment, the core does not have any twist, but the fibers are unidirectional. A standard winding wheel has a diameter of 3.5 feet with the ability to store up to 40,000 feet of core material. The wheel is designed to accommodate the stiffness of the composite core member without forcing the core member into a configuration that is too tight. The winding wheel must also meet the requirements for transportation. Thus, the wheel must be sized to fit under bridges and be carried on semi-trailer beds or train beds. In a further embodiment, the winding system comprises a means for preventing the wheel from reversing flow from winding to unwinding. The means can be any device that prevents the wheel direction from reversing for example, a clutch or a brake system.

In a further embodiment, the process includes a quality control system comprising a line inspection system. The quality control process assures consistent product. The quality control system may include ultrasonic inspection of composite core members; record the number of tows in the end product; monitor the quality of the resin; monitor the temperature of the ovens and of the product during various phases; measure formation; or measure speed of the pulling process. For example, each batch of composite core member has supporting data to keep the process performing optimally. Alternatively, the quality control system may also comprise a marking system. The marking system may include a system to mark the composite core members with the product information of the particular lot. Further, the composite core members may be placed in different classes in accordance with specific qualities, for example, Class A, Class B and Class C.

The fibers used to process the composite core members can be interchanged to meet specifications required by the final composite core member product. For example, the process allows replacement of fibers in a composite core member having a carbon core and a glass fiber outer core with high grade carbon and E-glass. The process allows the use of more expensive better performing fibers in place of less expensive fibers due to the combination of fibers and the small core size required. In one embodiment, the combination of fibers creates a high strength inner core with minimal conductivity surrounded by a low modulus nonconductive outer insulating layer. In another embodiment, the outer insulating layer contributes to the flexibility of the composite core member and enables the core member to be wound, stored and transported on a transportation wheel.

Changing the composite core design may affect the stiffness and strength of the inner core. As an advantage, the core geometry may be designed to achieve optimal physical characteristics desired in a final ACCC cable. Another embodiment of the invention, allows for redesign of the composite core cross section to accommodate varying physical properties and increase the flexibility of the composite core member. Referring again to FIG. 5, the different composite shapes change the flexibility of the composite core member. The configuration of the fiber type and matrix material may also alter the flexibility. The present invention includes composite cores that can be wound on a winding wheel. The winding wheel or transportation wheel may be a commercially available winding wheel or winding drum. These wheels are typically formed of wood with an inside diameter of 3.5 feet or less. These wheels are not made in larger diameters commercially. However, special wheels can be made. However, these wheels with larger diameters still must be able to be transported. Thus, the wheel diameters and widths are limited by transportation requirements. The wheel must be able to fit under bridges and be carried on a semi-trailer or a train bed. The composite core of the present invention can be wound onto one of these winding wheels.

Stiffer cores may require a wheel diameter 7 feet or greater diameter, and these size winding wheels are not commercially viable. In addition, a winding wheel that size may not meet the transportation standards to pass under bridges or fit on semi-trailers. Thus, stiff cores are not practical. To increase the flexibility of the composite core, the core may be twisted or segmented to achieve a wrapping diameter that is acceptable. In one embodiment, the core may include one 360 degree twist of the fiber for every one revolution of core around the wheel to prevent cracking. Twisted fiber is included within the scope of this invention and includes fibers that are twisted individually or fibers that are twisted as a group. In other words, the fibers may be twisted as a roving, bundle, or some portion of the fibers. Alternatively, the core can be a combination of twisted and straight fiber. The twist may be determined by the wheel diameter limit. The tension and compaction stresses on the fibers are balanced by the single twist per revolution.

Winding stress is reduced by producing a segmented core. FIG. 5 illustrates some examples of possible cross section configurations of segmented cores. The segmented core under the process is formed by curing the section as separate pieces wherein the separate pieces are then grouped together. Segmenting the core enables a composite member product having a core greater than 0.375 inches to achieve a desirable winding diameter without additional stress on the member product.

Variable geometry of the cross sections in the composite core members may be processed as a multiple stream. The processing system is designed to accommodate formation of each segment in parallel. Preferably, each segment is formed by exchanging the series of consecutive bushings for bushings having predetermined configurations for each of the passageways. In particular, the size of the passageways may be varied to accommodate more or less fiber, the arrangement of passageways may be varied in order to allow combining of the fibers in a different configuration in the end product and further bushings may be added within the plurality of consecutive bushings to facilitate formation of the varied geometric cross sections in the composite core member. At the end of the processing system the five sections in five streams of processing are combined at the end of the process to form the composite cable core that form a unitary (one-piece) body. Alternatively, the segments may be twisted to increase flexibility and facilitate winding.

The final composite core can be wrapped in lightweight high conductivity aluminum forming a composite cable. While aluminum is used in the title of the invention and in this description, the conductor may be formed from any highly conductive substance. In particular, the conductor may be any metal or metal alloy suitable for electrical cables. While aluminum is most prevalent, copper may also be used. It may also be conceivable to use a precious metal, such as silver, gold, or platinum, but these metals are very expensive for this type of application. In an exemplary embodiment, the composite core cable comprises an inner carbon core having an outer insulating glass fiber composite layer and two layers of trapezoidal formed strands of aluminum.

In one embodiment, the inner layer of aluminum comprises a plurality of trapezoidal shaped aluminum segments helically wound or wrapped in a counter-clockwise direction around the composite core member. Each trapezoidal section is designed to optimize the amount of aluminum and increase conductivity. The geometry of the trapezoidal segments allows for each segment to fit tightly together around the composite core member.

In a further embodiment, the outer layer of aluminum comprises a plurality of trapezoidal shaped aluminum segments helically wound or wrapped in a clockwise direction around the composite core member. An opposite direction of wrapping prevents twisting of the final cable. Each trapezoidal aluminum element fits tightly with the trapezoidal aluminum elements wrapped around the inner aluminum layer. The tight fit optimizes the amount of aluminum and decreases the aluminum required for high conductivity.

EXAMPLE

A particular embodiment of the invention is now described wherein the composite strength member comprises E-glass and carbon type 13 sizing. E-glass combines the desirable properties of good chemical and heat stability, and good electrical resistance with high strength. The cross-sectional shape or profile is illustrated in FIG. 8 wherein the composite strength member comprises a concentric carbon core encapsulated by a uniform layer of glass fiber composite. In an exemplary embodiment the process produces a hybridized core member comprising two different materials.

The fiber structures in this particular embodiment are 126 ends of E-glass product, yield 900, Veterotex Amer and 16 ends of carbon Torayca T7DOS yield 24K. The resin used is Aralite MY 721 from Vantico or is JEFFCO 1401-16/4101-17 made by JEFFCO Products.

In operation, the ends of 126 fiber tows of E-glass and 16 fiber tows of carbon are threaded through a fiber tow guide comprising two rows of 32 passageways, two rows inner of 31 passageways and two innermost rows of 4 passageways and into a preheating stage at 150° F. to evacuate any moisture. After passing through the preheating oven, the fiber tows are pulled through a wet out tank. In the wet out tank a device effectually moves the fibers up and down in a vertical direction enabling thorough wetting of the fiber tows. On the upstream side of the wet out tank is located a wiper system that removes excess resin as the fiber tows are pulled from the tank. The excess resin is collected by a resin overflow tray and added back to the resin wet out tank.

The fiber tows are pulled from the wet out tank to a B-state oven that semi-cures the resin impregnated fiber tows to a tack stage. At this stage the fiber tows can be further compacted and configured to their final form in the next phase. The fiber tows are pulled to a next oven at B-stage oven temperature to maintain the tack stage. Within the oven are eight consecutive bushings that function to compact and configure the fiber tows to the final composite core member form. Two fiber tow ends are threaded through each of the 134 passageways in the first bushing which are machined to pre-calculated dimensions to achieve a fiber volume of 72 percent and a resin volume of 28 percent in the final composite core member. The ends of the fiber tows exiting from passageways in the top right quarter comprising half of the two top rows are threaded through passageways 132 of the next bushing; the ends of the fiber tows exiting from passageways in the top left quarter comprising half of the top two rows are threaded through passageway 136 of the next bushing; the ends of the fiber tows exiting from passageways in the lower right quarter comprising half of the bottom two rows are threaded through passageway 140 of the next bushing; the ends of the fiber tows exiting from passageways in the lower left quarter comprising half of the bottom two rows are threaded through passageway 138 of the next bushing; the right and left quarters of passageways in the middle upper row are threaded through passageways 142 and 144 of the next bushing and the right and left quarters of passageways in the middle bottom row are threaded through passageways 134 and 146 respectively.

The fiber tows are pulled consecutively through the outer and inner passageways of each successive bushing further compacting and configuring the fiber bundles. At bushing seven, the fiber bundles pulled through the inner four passageways of bushing six are combined to form a composite core whereas the remaining outer passageways continue to keep the four bundles glass fibers separate. The four outer passageways of bushing seven are moved inward in bushing eight, closer to the inner carbon core. The fiber tows are combined with the inner carbon core in bushing nine forming a hybridized composite core member comprising an inner carbon core having an outer glass layer.

The composite core member is pulled from bushing nine to a final curing oven at an elevated temperature of 380° F. as required by the specific resin. From the curing oven the composite core member is pulled through a cooling oven to be cooled to 150° F. to 180° F. After cooling, the composite core member is pulled through a post curing oven at elevated temperature, preferably to heat the member to at least B-stage temperature. After post-curing, the member is cooled by air to approximately 180° F. The member is cooled prior to grabbing by the caterpuller. The core is finally fed onto a winding wheel having around 6000 feet of storage.

EXAMPLE

An example of an ACCC reinforced cable in accordance with the present invention follows. An ACCC reinforced cable comprising four layers of components consisting of an inner carbon fiber and epoxy layer, a next glass fiber and epoxy layer and two layers of tetrahedral shaped aluminum strands. The strength member consists of a high-strength composite T700S carbon fiber and epoxy having a diameter of about 0.2165 inches, surrounded by an outer layer of R099-688 glass fiber and epoxy having a layer diameter of about 0.375 inches. The glass fiber and epoxy layer is surrounded by an inner layer of nine trapezoidal shaped aluminum strands having a diameter of about 0.7415 inches and an outer layer of thirteen trapezoidal shaped aluminum strands having a diameter of about 1.1080 inches. In the cross section, the total area of carbon is about 0.037 in$^2$, of glass is about 0.074 in$^2$, of inner aluminum is about 0.315 in$^2$ and outer aluminum is about 0.5226 in$^2$. The fiber to resin ratio in the inner carbon strength member is 70/30 by weight and the outer glass layer fiber to resin ratio is 75/25 by weight.

The specifications are summarized in the following table:

| | |
|---|---|
| Glass | |
| Vetrotex roving R099-686 (900 Yield) | |
| Tensile Strength, psi | 298,103 |
| Elongation at Failure, % | 3.0 |
| Tensile Modulus, x $10^6$ psi | 11.2 |
| Glass Content, % | 57.2 |
| Carbon (graphite) | |
| Carbon: Torayca T700S (Yield 24 K) | |
| Tensile strength, Ksi | 711 |
| Tensile Modulus, Msi | 33.4 |
| Strain | 2.1% |
| Density lbs/ft$^3$ | 0.065 |
| Filament Diameter, in | 2.8E–04 |
| Epoxy Matrix System | |
| Araldite MY 721 | |
| Epoxy value, equ./kg | 8.6–9.1 |
| Epoxy Equivalent, g/equ. | 109– |
| Viscosity @ 50 C, cPs | 3000–6000 |
| Density @ 25 C lb/gal. | 1.150–1.18 |
| Hardener 99-023 | |
| Viscosity @ 25 C, cPs | 75–300 |
| Density @ 25 C, lb/gal | 1.19–1/22 |
| Accelerator DY 070 | |
| Viscosity @ 25 C, cPs | <50 |
| Density @ 25 C, lb/gal | 0.95–1.05 |

An ACCC reinforced cable having the above specifications is manufactured according to the following. The process used to form the composite cable in the present example is illustrated in FIG. 1. First, 126 spools of glass fiber tows 12 and 8 spools of carbon are set up in the rack system 14 and the ends of the individual fiber tows 12, leading from spools 11, are threaded through a fiber tow guide 18. The fibers undergo tangential pulling to prevent twisted fibers. A puller 16 at the end of the apparatus pulls the fibers through the apparatus. Each dispensing rack 14 has a small brake to individually adjust the tension for each spool. The tows 12 are pulled through the guide 18 and into a preheating oven 20 at 150° F. to evacuate moisture.

The tows 12 are pulled into wet out tank 22. Wet out tank 22 is filled with Araldite MY 721/Hardener 99-023/Accelerator DY070 to impregnate the fiber tows 12. Excess resin is removed from the fiber tows 12 during wet out tank 22 exit. The fiber tows 12 are pulled from the wet out tank 22 to a B-stage oven 24 and are heated to 200° F. Fiber tows 12 are kept separated by the guide 18 and are pulled into a second B-stage oven 26 also at 200° F comprising a plurality of consecutive bushings to compact and configure the tows 12. In the second B-stage oven 26, the fiber tows 12 are directed through a plurality of passageways provided by the bushings. The consecutive passageways continually compact and configure the fiber tows 12 into the final uniform composite core member.

The first bushing has two rows of 32 passageways, two inner rows of 31 passageways each and two inner most rows of 4 passageways each. The 126 glass fiber tows are pulled through the outer two rows of 32 and 31 passageways, respectively. The carbon fiber tows are pulled through the inner two rows of 4 passageways each. The next bushing splits the top two rows in half and the left portion is pulled through the left upper and outer corner passageway in the second bushing. The right portion is pulled through the right upper and outer corner passageway in the second bushing. The bottom two rows are split in half and the right portion is pulled through the lower right outer corner of the second bushing and the left portion is pulled through the lower left outer corner of the second bushing. Similarly, the two inner rows of carbon are split in half and the fibers of the two right upper passageways are pulled through the inner upper right corner of the second bushing. The fibers of the left upper passageways are pulled through the inner upper left corner of the second bushing. The fibers of the right lower passageways are pulled through the inner lower right corner of the second bushing and the fibers of the left lower passageways are pulled through the inner lower left corner of the second bushing.

The fiber bundles are pulled through a series of seven bushings continually compacting and configuring the bundles into one hybridized uniform concentric core member.

The composite core member is pulled from the second B-stage oven 26 to a next oven processing system 28 at 330° F. to 370° F. wherein the composite core member is cured and pulled to a next cooling system 30 at 30° F. to 100° F. for cooling. After cooling, the composite core is pulled to a next oven processing system 32 at 330° F. to 370° F. for post curing. The pulling mechanism pulls the product through a 10 foot air cooling area at about 180° F.

Nine trapezoidal shaped aluminum strands each having an area of about 0.0350 sq. in. or about 0.315 sq. in. total area on the core are wrapped around the composite core after cooling. Next, thirteen trapezoidal shaped aluminum strands each strand having an area of about 0.0402 sq. in. or about 0.5226 sq. in. total area on the core are wrapped around the inner aluminum layer.

It is to be understood that the invention is not limited to the exact details of the construction, operation, exact materials, or embodiments shown and described, as modifications and equivalents will be apparent to one skilled in the art without departing from the scope of the invention.

We claim:

1. A method of high-speed processing a composite core comprising the steps of:
    a. providing a plurality of fiber tows;
    b. guiding the fiber tows through a wet-out system filled with resin to form resin impregnated fiber tows;
    c. using a B stage oven and two or more dies spaced apart to shape and compact the resin impregnated fiber tows, wherein the B stage oven maintains the resin impregnated fiber tows in a semi-cure stage and wherein, the two or more dies shape and compact the resin impregnated fiber tows; and
    d. curing the composite core member.

2. A method according to claim 1, wherein at least one of the dies is a bushing.

3. A method according to claim 1, wherein the wet-out system comprises a system to aid in wetting the fibers.

4. A method according to claim 1, wherein the wet-out system is a wet-out tank.

5. A method according to claim 1, wherein shaping and compacting the fiber tows further comprises:
    a. guiding the fiber tows into a first B-stage temperature oven;
    b. guiding the fiber tows into a second B-stage temperature oven comprising a plurality of bushings wherein each bushing comprises a plurality of passageways;
    c. guiding the fiber tows through the bushings and the passageways; and
    d. using the bushings to form the composite core.

6. A method according to claim 5, wherein the first B-stage temperature oven is in the range of about 150° F. to about 350° F.

7. A method according to claim 5, wherein the second B-stage temperature oven is in the range of about 150° F. to about 350° F.

8. A method according to claim 1, wherein the step of curing the composite core further comprises:
- a. guiding the composite core through a curing oven wherein a temperature of the curing oven is in the range of about 300° F. to about 400° F.;
- b. guiding the composite core through a cooling zone wherein a temperature of the cooling zone is in the range of about 30° F. to about 100° F.;
- c. guiding the composite core through a post-cure oven wherein a temperature of the post-cure oven is in the range of about 300° F. to about 400° F.; and
- d. guiding the composite core through a cooling zone wherein the core is cooled by air to bring a temperature of the core into the range of about 120° F. to about 180° F.

9. A method according to claim 1, wherein the method of processing has a maximum processing speed above 6 ft/mm.

10. A method according to claim 9, wherein the maximum processing speed is within the range of about 9 ft/mm to about 60 ft/mm.

11. A method of high-speed processing a composite core comprising the steps of:
- a. providing a plurality of fiber tows;
- b. guiding the fiber tows through a wet-out system filled with resin;
- c. using a B-stage oven and two or more dies spaced apart to shape and compact the fiber tows, wherein at least one of the dies is a plate having a plurality of passageways wherein the orientation of the passageways is determined by the desired cross section configuration of the composite core; and
- d. curing the composite core member.

* * * * *